US011354251B2

(12) United States Patent
Coppola et al.

(10) Patent No.: US 11,354,251 B2
(45) Date of Patent: Jun. 7, 2022

(54) APPARATUS AND METHODS IMPLEMENTING DISPATCH MECHANISMS FOR OFFLOADING EXECUTABLE FUNCTIONS

(71) Applicants: STMicroelectronics (Grenoble 2) SAS, Grenoble (FR); TECHNOLOGICAL EDUCATIONAL INSTITUTE OF CRETE, Crete (GR)

(72) Inventors: Antonio-Marcello Coppola, Sassenage (FR); Georgios Kornaros, Crete (GR); Miltos Grammatikakis, Crete (GR)

(73) Assignees: STMICROELECTRONICS (GRENOBLE 2) SAS, Grenoble (FR); TECHNOLOGICAL EDUCATIONAL INSTITUTE OF CRETE, Crete (GR)

( * ) Notice: Subject to any disclaimer, the term of this patent is extended or adjusted under 35 U.S.C. 154(b) by 0 days.

(21) Appl. No.: 17/220,252

(22) Filed: Apr. 1, 2021

(65) Prior Publication Data
US 2021/0224196 A1    Jul. 22, 2021

Related U.S. Application Data

(60) Continuation of application No. 16/296,706, filed on Mar. 8, 2019, now Pat. No. 10,970,229, which is a
(Continued)

(30) Foreign Application Priority Data
Jan. 15, 2016    (GR) .............................. 20160100013

(51) Int. Cl.
G06F 12/1009    (2016.01)
G06F 12/1036    (2016.01)
(Continued)

(52) U.S. Cl.
CPC ........ *G06F 12/1009* (2013.01); *G06F 9/4401* (2013.01); *G06F 9/44505* (2013.01);
(Continued)

(58) Field of Classification Search
None
See application file for complete search history.

(56) References Cited

U.S. PATENT DOCUMENTS 6,349,355 B1    2/2002    Draves et al.
9,176,795 B2 *  11/2015   McCrary ................. G06F 9/544
(Continued)

OTHER PUBLICATIONS

Glossner et al. HSA enabled DSPs and accelerators; 2015 IEEE Global Conference on Signal and Information Processing; pp. 1407-1411; Dec. 2015 (Year: 2015).*
(Continued)

*Primary Examiner* — Kaushikkumar M Patel
(74) *Attorney, Agent, or Firm* — Slater Matsil, LLP

(57) ABSTRACT

A method of offloading a computing kernel from a host central processing unit (CPU) to a co-processor includes obtaining, by an application running on the host CPU, a virtual address of a packet in a user level queue of a general packet processing unit (GPPU) and initializing, by the application, the packet referenced by the virtual address using an application programming interface of a user level device driver (ULDD). The packet includes a plurality of handles corresponding to the computing kernel. The method further includes finalizing, by the ULDD, the packet by including a list of bootstrap translation addresses comprising a physical address and a virtual address for each of the plurality of handles and output by a kernel level device driver (KLDD) of an operating system running on the host CPU, and accessing, by the application using the virtual address, results obtained from the co-processor processing the computing kernel.

20 Claims, 17 Drawing Sheets

Related U.S. Application Data division of application No. 15/402,515, filed on Jan. 10, 2017, now Pat. No. 10,261,912.

(51) Int. Cl.
  *G06F 9/4401* (2018.01)
  *G06F 9/445* (2018.01)
  *G06F 9/54* (2006.01)
  *G06F 15/167* (2006.01)

(52) U.S. Cl.
  CPC .......... *G06F 9/545* (2013.01); *G06F 12/1036* (2013.01); *G06F 15/167* (2013.01); *G06F 2212/657* (2013.01)

(56) References Cited

U.S. PATENT DOCUMENTS

| | | |
|---|---|---|
| 2004/0015622 A1 | 1/2004 | Avery |
| 2007/0283131 A1 | 12/2007 | Sagalovitch et al. |
| 2009/0216998 A1 | 8/2009 | Machulsky et al. |
| 2010/0118041 A1 | 5/2010 | Chen et al. |
| 2010/0312850 A1 | 12/2010 | Deshpande |
| 2010/0321397 A1 | 12/2010 | Ginzburg |
| 2011/0161620 A1* | 6/2011 | Kaminski ........... G06F 12/1009 711/207 |
| 2012/0194526 A1 | 8/2012 | Sander et al. |
| 2013/0160016 A1 | 6/2013 | Gummaraju et al. |
| 2013/0205299 A1 | 8/2013 | Shin et al. |
| 2014/0049551 A1 | 2/2014 | Rao et al. |
| 2014/0101405 A1 | 4/2014 | Papadopoulou et al. |
| 2014/0325163 A1* | 10/2014 | Arndt .................. G06F 12/1036 711/153 |
| 2016/0378674 A1 | 12/2016 | Cheng et al. |
| 2017/0060607 A1 | 3/2017 | Hollinger |
| 2017/0206169 A1 | 7/2017 | Coppola et al. |

OTHER PUBLICATIONS

Garland, et al., "Understanding throughput-oriented architectures," Communications of the ACM, vol. 53, Issue 11, Nov. 2010, pp. 9.

Liljegren, Mat, "User-Space Device Drivers in Linux: A First Look," http://www.enea.com/Documents/Resources/Whitepapers/Enea-User-Space-Drivers-in-Linux_Whitepaper_2013, retrieved from internet Jan. 6, 2017, pp. 4.

Rinke, et al., "Efficient Offloading of Parallel Kernels Using MPI_Comm_Spawn," IEEE 42nd International Conference on Parallel Processing (ICPP), 2013. Abstract Only.

* cited by examiner

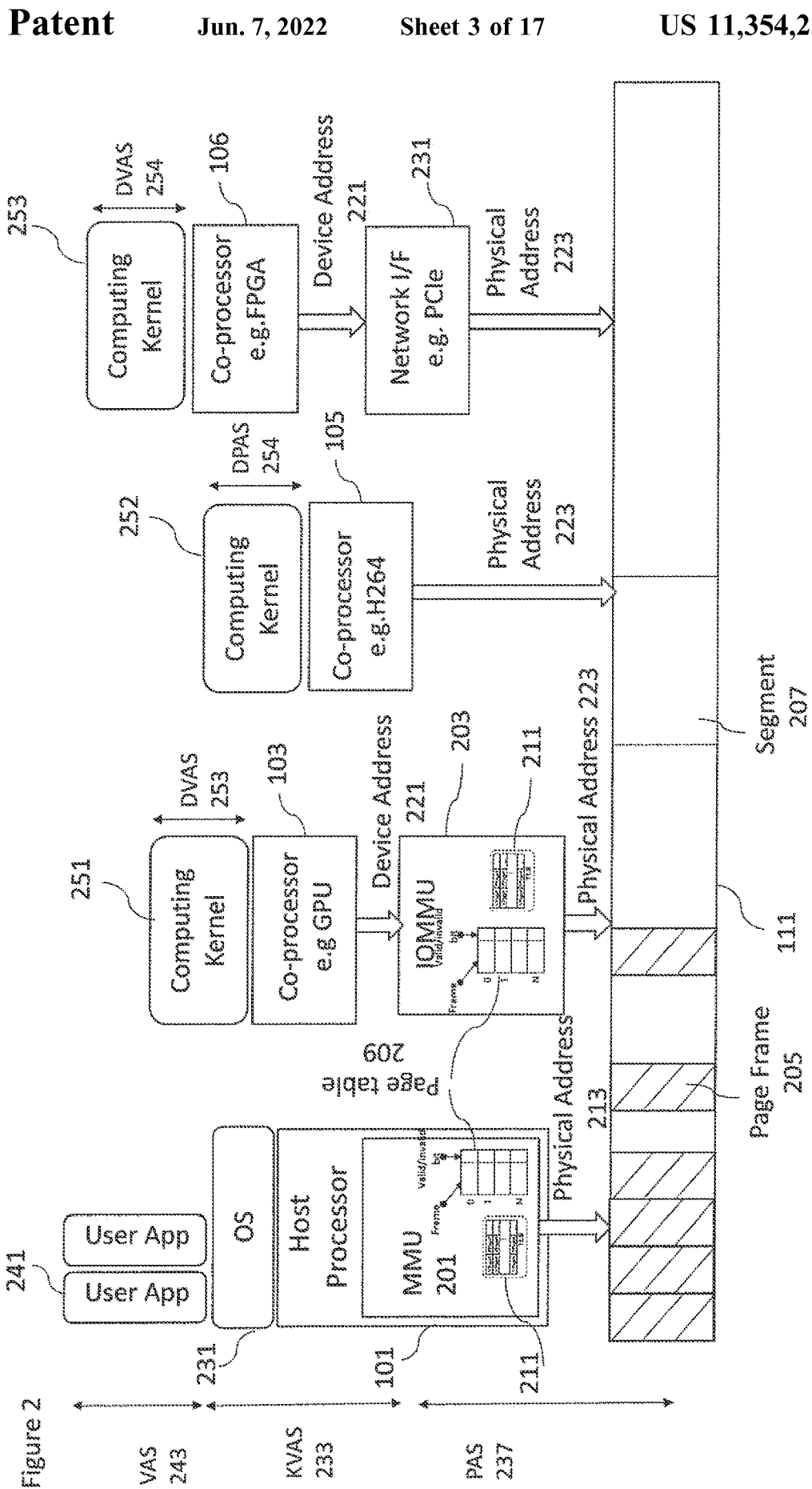

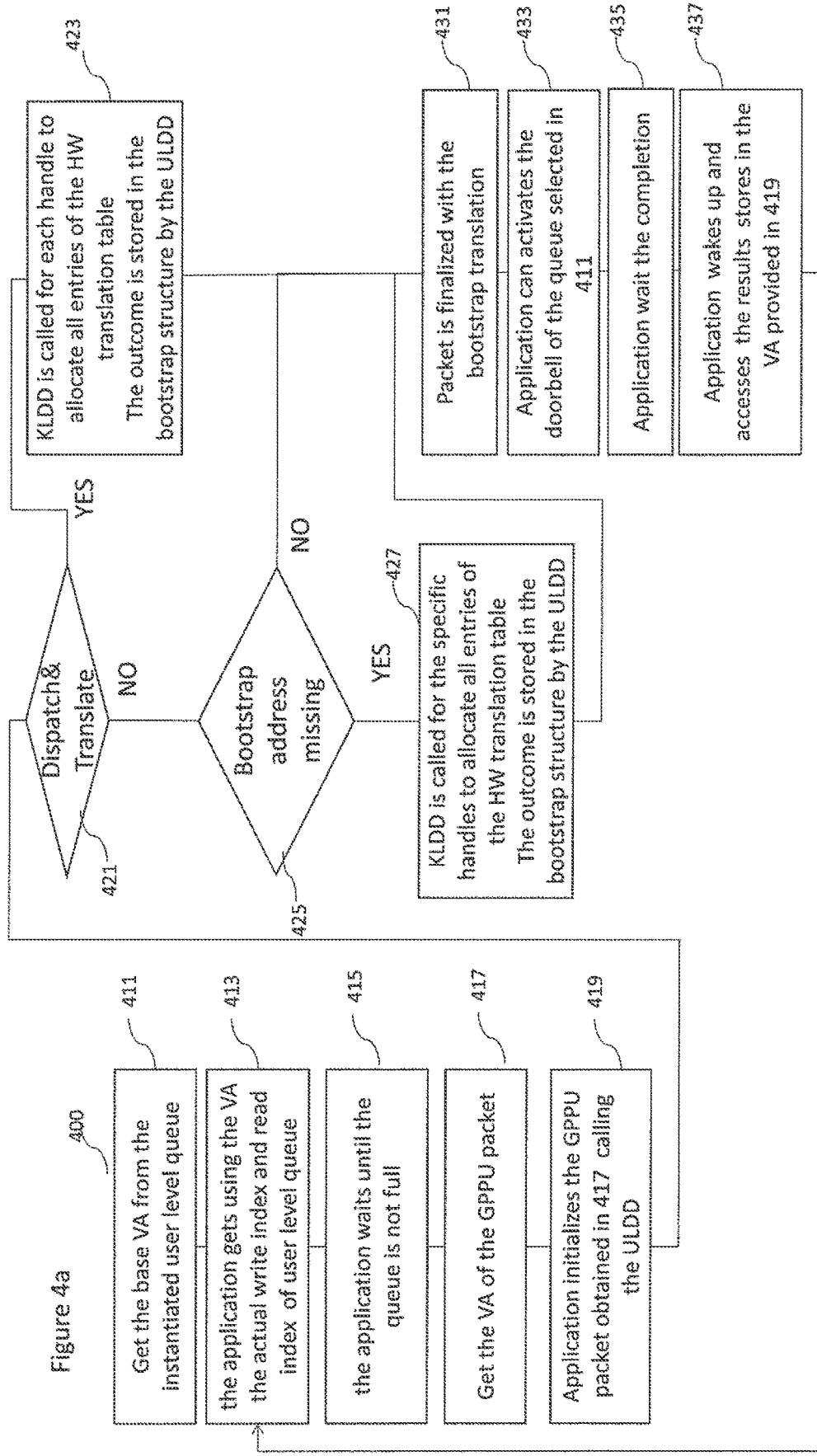

Bootstrap Translation Structure

| Process ID | Bootstrap address | | Length |
|---|---|---|---|
| PID | VA | PA | bytes |
| PID | VA | PA | bytes |
| PID | VA | PA | bytes |
| PID | VA | PA | bytes |

Figure 4b

APPARATUS AND METHODS IMPLEMENTING DISPATCH MECHANISMS FOR OFFLOADING EXECUTABLE FUNCTIONS

CROSS-REFERENCE TO RELATED APPLICATIONS

This application is a continuation of U.S. patent application Ser. No. 16/296,706, filed Mar. 8, 2019, which is a divisional of U.S. patent application Ser. No. 15/402,515, filed Jan. 10, 2017, now issued as U.S. Pat. No. 10,261,912, which claims the benefit of Greek Patent Application No. 20160100013 filed Jan. 15, 2016, which applications are hereby incorporated herein by reference in their entirety.

TECHNICAL FIELD

Some embodiments relate to an apparatus and method for performing hardware acceleration, and more precisely, to an apparatus and method to offload executable functions between a host CPU and a further on-chip heterogeneous co-processor in a multiprocessor system, and or off-chip, such as a field-programmable gate array (FPGA) or a discrete graphical processing unit (GPU).

BACKGROUND

Existing multiprocessor system on chip (MPSoC) implementations (also called multicore SoC) often comprise more than one kind of processor usually on the same silicon die. Thus, for example, on the same silicon die an MPSoC may comprise a central processing unit (CPU) also called a host CPU, a graphical processing unit (GPU) and programmable and nonprogrammable processing units. A GPU, apart from its well-known 3D graphics rendering capabilities, can also perform mathematically intensive computations on very large data sets, while the host CPUs include several cores running the operating system and perform traditional tasks. Furthermore, other specialized processing units may be used, such as hardware accelerators configured to run specific functions, such as 4K video encoding and decoding. These accelerators may be designed to be programmable (own an instructions set) or hardcoded or hardwired for one type of function. In other words, multicore systems may gain performance not just by exploiting additional cores, but also by incorporating specialized processing capabilities to handle particular tasks.

With respect to FIG. 1a, an example computing system is shown. The computing system is a simplification of a complete computing system. The computing system in FIG. is comprises a host system formed by a MPSoC and a host memory 111 realized in the same or in a different package and connected via a memory controller 109.

The MPSoC 1 comprises a host processor 101 which may include a central processing unit (CPU), on-chip co-processors 103, 105 and memory controllers 109. This CPU may include one or more independent cores. Well known examples are a dual-core CPU which includes 2 cores while a quad-core CPU includes 4 cores. These cores share a single coherent cache at the highest level. A host processor may be implemented using homogeneous or heterogeneous cores. Homogeneous cores share the same fixed instructions sets. Furthermore, FIG. is shows the computing system comprising a co-processor 103 which may be a GPU and further co-processors, for example, co-processor #N 105. Furthermore, in some embodiments the computing multiprocessor system may comprise one or more discrete co-processors 2 and 3. The discrete co-processors 2 and 3 may be connected to the MPSoC 1 via a suitable network technology 120. The discrete coprocessors including the MPSoC can communicate with each other via network adapters 107, 104. In some embodiments the discrete part may comprise a FPGA or a discrete GPU, for example, co-processor #M 106 that may include a local memory 112 or an external memory 114. Each of the co-processors may be coupled via a local memory bus 121 to a physical memory controller 109 which provides communications with the memory 111. Each of the co-processors may be coupled via a memory bus to a physical memory 111 or 112 which may be any suitable storage. Direct memory access (DMA) is one well known technique to share memory between a host CPU and a co-processor. The co-processors performs DMA operations (directly read or write data without intervention of the Host CPU) to a physical memory that has been configured by the operative system of the Host CPU. Similarly, RDMA is a well-known technology to share data between 2 discrete co-processors. The discrete coprocessor 2 issues a read request that includes a destination memory address in its local memory 112 without the intervention of the Host MPSoC. The target co-processor 3 responds by writing the desired data directly at the specified memory address located into the memory 112. There is no buffering and minimal operating system involvement since data is copied by the network adapters.

Usually multiprocessor architectures use virtual addresses. A virtual address is an address used by the processor identifying a virtual (non-physical) memory location. As is well known in the art, the virtual to physical memory mapping is implemented by memory management units (MMUs) dividing the virtual memory address space into pages and by using translation tables stored in memory and managed by an operating system. To make this translation efficient, a modern host processor may include a (MMU) as shown in FIG. 1b that also includes a structure (called Translation Look-aside Buffer, TLB) that keeps a record of the latest virtual-to-physical address translations. Since the TLB has a fixed number of entries, if a translation is not present, several actions have to be performed to make the translation. This implies an overhead in terms of time and power due to the additional memory accesses. Generally, these actions are performed by a page-table walker logic that performs a page-table walk to find the necessary translation information. For example, when a co-processor requests information that is not cached in the TLB (i.e., a miss), the page-table walker is used to obtain information from the system memory.

Similarly, as is also known in the art, an Input/Output (IO) MMU may be associated with some of the co-processors. As shown in FIG. 1b the IO MMU can be located inside the co-processor (e.g., as shown in FIG. 1b within the GPU 103) or outside the coprocessor (e.g., as shown in FIG. 1b by the IO MMU 107 located separate from the co-processor #N 105). Using the IO MMU a plurality of co-processors may be configured to share the page table structure with the Host CPU, and to perform read or write operations on the physical memory shared with the operating systems partition of the host processor 101. Otherwise, the sharing has to be done in special memory partitions configured by the operating system of the Host CPU.

Integrating IO MMU to a coprocessor gives the impression of a contiguous working memory (a Virtual address space), while in fact it may be physically fragmented. With an IOMMU it is possible to translate the virtual addresses of the co-processor to the corresponding physical addresses of the physical memory. As described for the MMU it may include a TLB to make efficient the overall translation process.

As the size of (multimedia, network, etc.) data increases, a size of the continuous memory that is required by the DMA operation increases making it hard for the co-processor to get a large size of a continuous physical memory. Including an IO MMU to the co-processor, a plurality of virtual address spaces will be associated to the plurality of coprocessors making the large size of a continuous physical memory requirement no longer necessary during DMA operations.

However, an IOMMU can be complex to implement. The silicon area and power dissipation of the multiprocessor system are increased.

The operating system such as shown in FIG. 3a may comprise a layer which has many responsibilities. In particular, the OS layer may manage the memory (by splitting it into kernel space 3105 and user space 3104) and system resources. The main part of the OS is the OS kernel (3102) that is maintained in the main memory. It also provides an API to enable application (3101) to gain access to co-processors that is realized via the kernel level device drivers (3103). A kernel level device driver (KLDD) is an application that runs in protected or privileged mode, and has full, unrestricted access to all MPSoC system memory, co-processors, and other protected components of the OS. It accepts a high-level command from the OS kernel 3102 or an application, and translates them to a series of low-level commands specific to a co-processor. The KLDD 3103 also includes an interrupt service routine (ISR) 3109 that is used by the OS kernel to manage specific hardware interrupts.

By contrast, a user level device driver (ULDD) 3107 refers to a device driver run in user space and cannot gain access to system components except by calling the appropriate Host OS API.

The MPSoC applications 3101 (with one or more threads) may include typical, computational intensive functions (herein referred as computing kernels) executing in the host processing cores which may be accelerated by offloading them to the co-processors. In order to implement the offloading it is necessary to transfer data (and/or code) from the host to the co-processor. This is done usually through OS mediation combined with MMU, IOMMUs, and/or copy engines implementing (DMAs) operations. However IOMMU and DMA apparatus and techniques may incur significant latency penalties while transferring code and/or data between processing units. In addition, a significant burden is required by different components (OS, device drivers, application) to make this process work smoothly.

SUMMARY

According to a first aspect there is provided an apparatus comprising a first processor configured to execute a user-level application that operates in a virtual address space; a co-processor configured to execute a computing kernel function associated with user-level application elements to be performed on the co-processor, the computing kernel configured to operate in a virtual address space; a memory comprising physical addresses, the memory comprising a partition managed by an OS kernel associated with the first processor and used to map the virtual address spaces and further associated with the co-processor and suitable for mapping its virtual address space; and a packet processor configured to manage communications between the first processor and the co-processor. The packet processor may be configured to receive at least one packet from the first processor. The at least one packet may comprise memory addresses identifying the code and data of the computing kernel. The packet processor may store the at least one packet in a queue associated with the user level application, and output the at least one packet to the co-processor, such that the co-processor is enabled to execute the computing kernel.

The packet processor may further comprise a hardware address translator programmed by the packet processor itself to translate second processor virtual addresses to memory physical addresses.

Thus, in some embodiments the necessity to use an IOMMU may be removed. The hardware translation table may include a plurality of entries each associated with a page frame, and for each entry, an associated indicator identifying if the entry is valid or not, and a cache coherency identification denoting whether all GPPU accesses using addresses in the corresponding page frame have to be considered I/O coherent or non-coherent.

The hardware translation table may support multiple page frame sizes wherein bits of the virtual address produced by the co-processor identify the multiple page frame sizes. The hardware translation table may be only updated when a current packet is a dispatch and translate type. Thus, in some embodiments, the GPPU may apply the previous translation rules to the current packet.

The apparatus may further comprise a second co-processor and a second packet processor wherein the packet processor and the second packet processor enable direct communications between the co-processor and the second co-processor.

The packet processor may be configured to extract from the received packets translation information used to populate a hardware translation table. The hardware translation table may comprise two parts. A first part may be configured to be updated with the translation information stored in the packet and a second part may be reserved that is only written to at initialization.

The packet processor may be configured to use at least one of a high performance bus protocol used to communicate with the system memory, and a programming port used to communicate with the first processor. The packet processor may further comprise a global counter configured to store the average kernel execution time.

The co-processor may be configured to execute a computing kernel function using at least one object code buffer allocated in the virtual address space, and may be mapped in one or more page frames for storing instructions for execution by the co-processor. More particularly, the object code buffer may store the instructions associated with the user-level application elements to be performed on the co-processor. In some embodiments the co-processor may be configured to execute a computing kernel function using at least one buffer allocated in the virtual address space, and mapped in one or more page frames for storing instructions for execution by the co-processor. The instructions may be associated with the user-level application elements to be performed on the co-processor. In some embodiments the co-processor may be configured to execute a computing kernel function using at least one data buffer allocated in the virtual address space, and mapped in one or more page frames for storing data for the co-processor. The data may be associated with the user-level application elements to be performed on the co-processor.

The co-processor may be configured to execute a computing kernel function using at least one result buffer allocated in the virtual address space, and mapped in one or more page frames for storing results associated with the user-level application elements performed on the co-processor.

The queue may comprise a pointer to the circular buffer where packets are stored, and a circular buffer accessible from the virtual address space.

The apparatus may be where packets stored in the queues are accessible from virtual address space.

The packet processor may further comprise a timer for synchronizing communications with the packets between the packet processor and the processor and the co-processor.

The packet processor may further comprise an interrupt generator for synchronizing communications with the packets between the packet processor and the processor and co-processor by notifying that a packet is processed.

The first processor may be configured to poll the packet processor to identify whether processing is complete.

The packet processor may further comprise an interrupt generator configured to generate an interrupt designated for a user application address space and communicate to the user application a termination of a computing kernel function offloading.

The co-processor may be configured to communicate a completion signal to the packet processor to indicate to the packet processor that the computing kernel function has been completed.

The packet processor may be configured to process a further packet after receiving the completion signal.

The first processor may be a further co-processor.

The co-processor may be an on-chip co-processor located on the die of the first processor.

The co-processor may be a discrete co-processor located physically separate from the first processor and configured to communicate with the first processor via a network adaptor.

According to a second aspect there is provided a method for managing communications between a first processor configured to execute a user-level application that operates in a virtual address space, a co-processor configured to execute a computing kernel function associated with user-level application elements to be performed on the co-processor, and the computing kernel may be configured to operate in a virtual address space. The method may comprise receiving at least one packet from the first processor, with the at least one packet comprising memory addresses identifying the code and data of the computing kernel. The at least one packet may be stored in a queue associated with the user level application. The at least one packet may be output to the co-processor, such that the co-processor is enabled to execute the computing kernel.

The method may further comprise starting a first timer with a first timer period following outputting the at least one packet to the co-processor; and outputting the at least one further packet to the first processor when the first timer period expires.

The method may further comprise generating an interrupt for synchronizing communications with the results packets between a packet processor and the first processor.

The method may further comprise polling a packet processor to identify whether results packets are available.

According to a third aspect there is provided a method for enabling a user level application executed in a first processor to share a physical memory that is managed by and operated under the control of a host operating system with a co-processor. The method may comprise instantiating a plurality of user level queues, creating a plurality of circular buffers, pinning a memory page referenced by the first processor and/or the co-processor, enabling the circular buffer accessible in the virtual address space of the first processor, and enabling an enqueuing of a packet in a user space.

The method may further comprise managing, by a user level device driver, at least one of a shadow read index and a write index configured to implement queue mechanics.

The method may further comprise updating, by the user level device driver, the shadow write index after an enqueuing of a defined number of packets and/or when a user level queue is almost full.

The method may further comprise performing, by a kernel level device driver, a virtual to physical translation of page tables and sharing the translation to a packet processor.

The method may further comprise updating, by the user level device driver, a shadow write index following a determined time interval.

The method may further comprise checking the user queue, wherein checking the user queue comprises at least one of checking that the user level queue is full and calling the update function provided by the user level device driver before iterating in a loop cycle; when the user level device driver executes an update function, the current value of the read pointer is updated by issuing a read transaction on the read index register; when providing the current value of the read index, adding a coded integer that defines a mean time of computing kernel execution; when the user level device driver receives an answer of the read transaction it provide the control to the method to return a value; and when the method receives the value deciding to sleep or re-iterate a packet enqueuing.

The method may further comprise generating an interrupt designated for a user application address space to communicate to the user application a termination of a computing kernel function offloading.

The method may further comprise receiving from the co-processor a completion signal to indicate that the computing kernel function has been completed. The method may further comprise processing a further packet after receiving the completion signal.

BRIEF DESCRIPTION OF THE DRAWINGS

Reference is now made by way of example only to the accompanying drawings in which:

FIG. 2 shows an example shared memory architecture of a MPSoC;

FIGS. 4a, 4c show flowcharts of a method for supporting computing kernel offloading between the Host CPU and the co-processor according to an embodiment of the present disclosure;

FIG. 4b shows an example bootstrap translation structure table according to some embodiments;

DETAILED DESCRIPTION OF ILLUSTRATIVE EMBODIMENTS

Figure 1A:
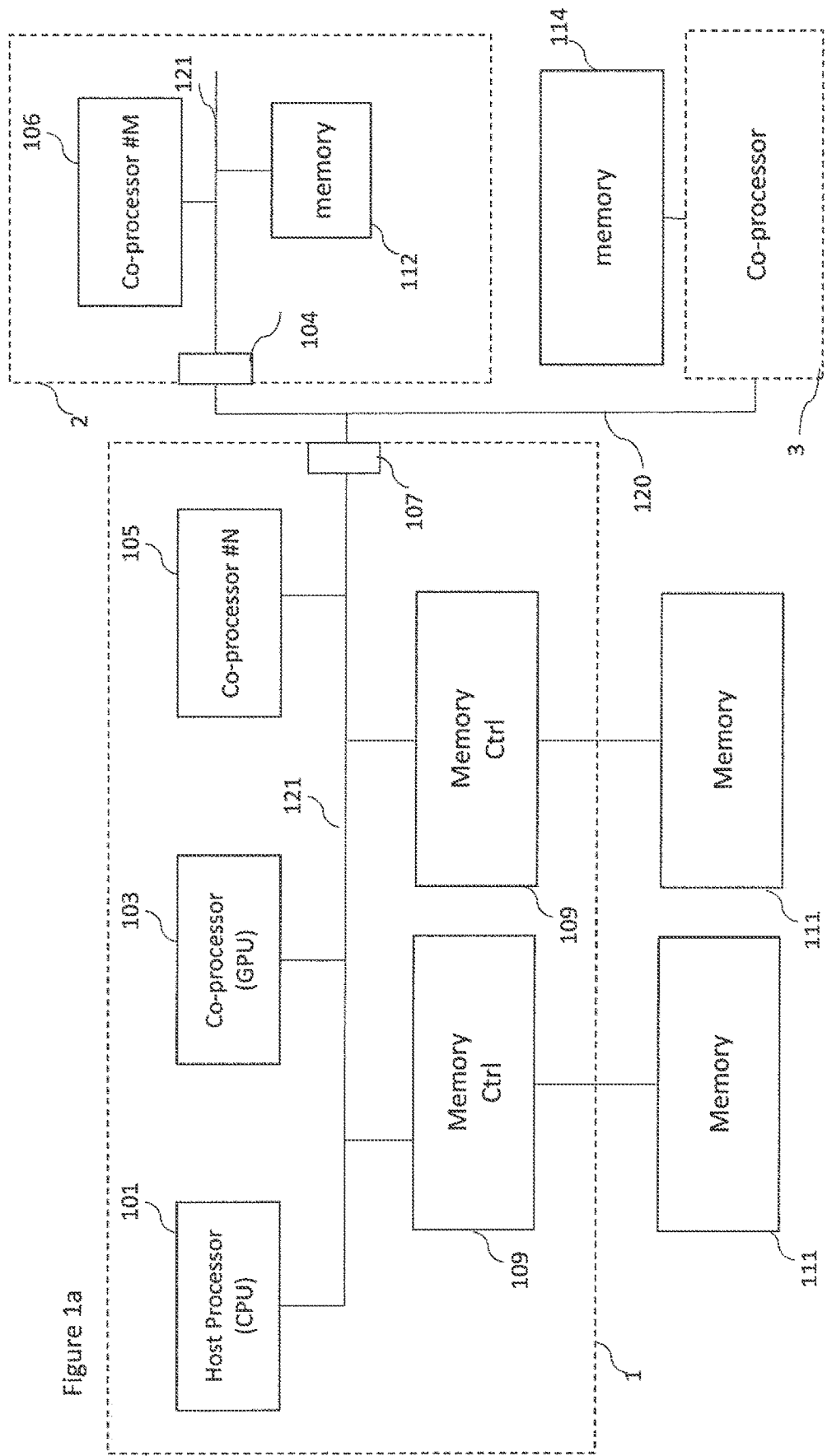
FIGS. 1s and 1b show example computing systems.
Figure 1B:
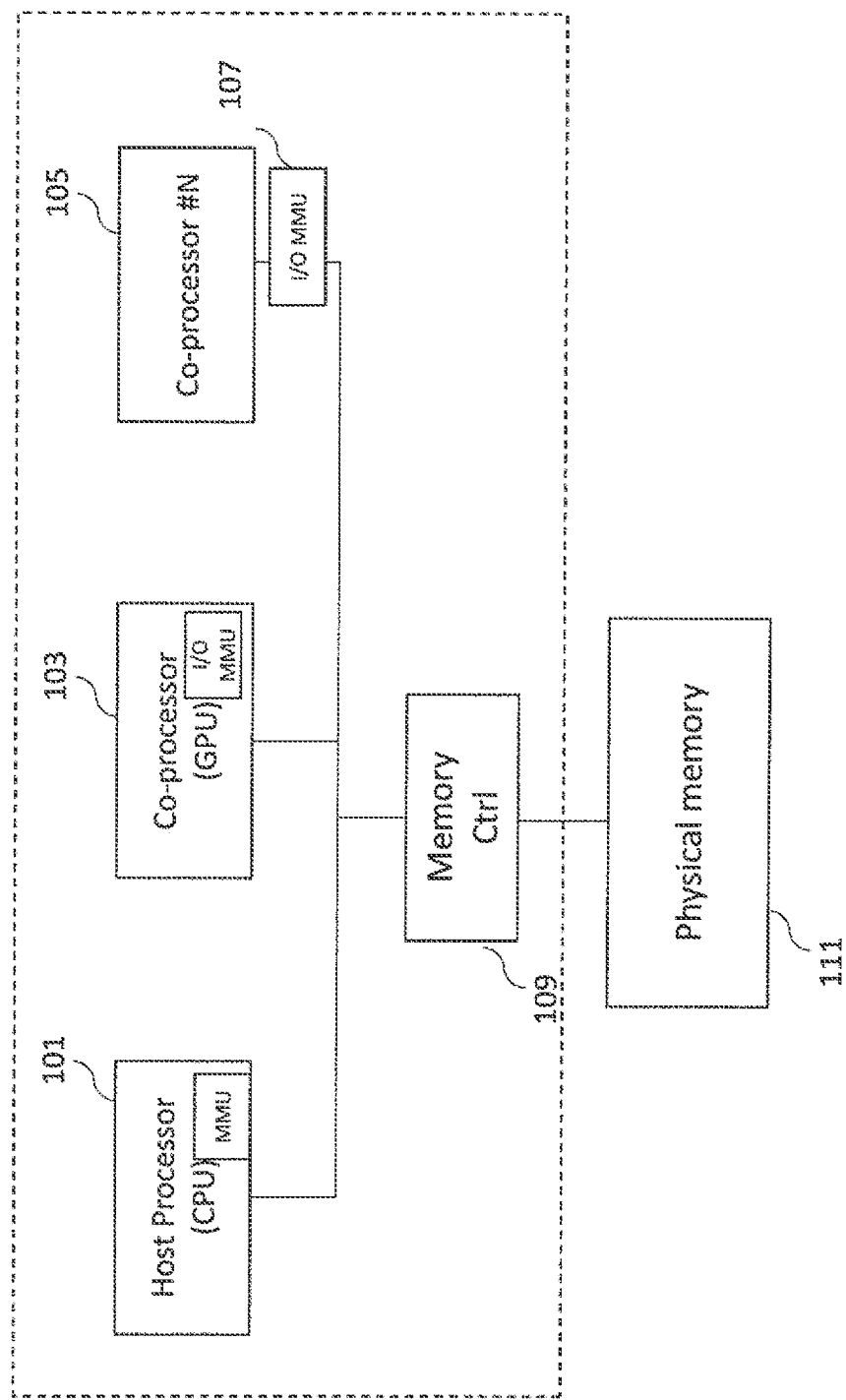

As described herein multiprocessor systems typically offload computation kernels (data and/or code) from host processors (such as a CPU) to on-chip and/or off-chip co-processors) by use of a (Input/Output) Memory Management Unit (IOMMU/MMU) that removes the necessity of allocating a large size of continuous physical memory. The co-processor may include a DMA engine to enable an efficient and parallel data transfer via a bus 121 of code or data that may be stored in the host physical memory 111. Using the DMA engine the co-processor is able to access data directly to the host memory while avoiding the need for extra memory within the on-chip co-processor.

With respect to FIG. 2 an example schematic of a computing system environment in which the disclosed embodiments may be implemented and a plurality of coprocessors is shown. As can be seen in FIG. 2 the host CPU 101 comprises or is associated with a MMU 201. Furthermore, running on the CPU 101 is an operating system (OS) 231 and running on the OS 231 is an example user application 241. Although only one user application is shown running on the OS 231 it is understood that more than one user application may be running on the OS 231 at the same time. The CPU 101 is further connected to the system of the main memory 111 via the memory bus.

The device 103 (which may be a GPU, Hardware accelerator or any suitable co-processor unit) may be further connected to the system main memory 111 via an IOMMU 203. A computing kernel 251 may run on the device 103. It is understood that the computation kernel 251 can be any suitable part of an application or program (with data) which can be accelerated on the device 103.

The device 105 (which may be a Hardware accelerator or any suitable co-processor unit) may be further connected to the system main memory 111. A computing kernel 252 may be run on the device 105. It is understood that the computation kernel 252 can be any suitable part of an application or program (with data) which can be accelerated on the device 105.

The device 106 may be a FPGA or any suitable external co-processor that are communicatively coupled to the MPSOC. The device 106 may be further connected to the system main memory 111 via a specific Network adapter 231 hardware component directly connected to the system bus. A computing kernel 253 may be run on the device 106. It is understood that the computation kernel 253 can be any suitable part of an application or program (with data) which can be accelerated on the device 106.

In the example shown in FIG. 2 the CPU MMU 201 enables the CPU 101 to translate (through page tables 209) virtual addresses, such as an address within a kernel virtual address space (KVAS) 233 used by the OS 231 and an application virtual address space (VAS) 243 from the user application, into physical addresses 213, which can be output onto the memory bus to access the memory.

In a similar manner the device 103 can generate a device address or device virtual address 221, such as an address within a kernel device virtual address space (DVAS) 253 used by the kernel 251 running on the device 103, which may be translated by the IOMMU 203 to generate a physical address 223 in order to access the memory 111. A device driver is a software component that permits a CPU OS to provide the necessary services to communicate with a particular co-processor. The CPU OS may communicate with a co-processor by invoking a service in the device driver. In response, the device driver issues the necessary read and writes bus transactions to the co-processor. These transactions may include DMA requests that trigger a data transfer from a physical memory location A (generally located in the system memory 111) to a location B that may be located within the co-processor. Because the driver handles co-processor specific features, an operating system is freed from the burden of having to understand and support needs of individual hardware devices.

Thus, the CPU OS 231 via the co-processor device driver may enable the offloading of computing kernels by providing the code and/or data memory handles (information about the whereabouts and length of the code or data buffers) to the device driver. Although at the virtual address space the memory where code and data are located is seen as a contiguous space in the physical memory 111, the memory is broken into frames and distributed in a non-contiguous fashion. A virtual memory system typically divides the physical address space into pages frames (usually a power of 2 division). The offset, which can be the bottom n bits of the address, are left unchanged. The virtual page number of the address may be the upper address bits. As known in the art, the MMU 201 and IOMMU 203 may be configured to translate virtual page numbers into physical page frames (205) via an internal translation look aside buffer 211 called TLB. If, as described previously, the TLB 211 is unable to translate the address a slower mechanism is used. This mechanism accessing the page table 209 structure translates the virtual page number into the corresponding physical frame number. Finally, the physical frame number can then be combined with the virtual page offset to give the complete physical address.

In implementing such a system the IOMMU 203 and MMU 201 may allow an operating system to encapsulate the device (or other co-processor) within its own virtual memory space, thus restricting the device access to specific memory pages. Therefore, code generated by the device is sandboxed so as to possibly prevent the device from accessing a secure memory.

Figure 3A:
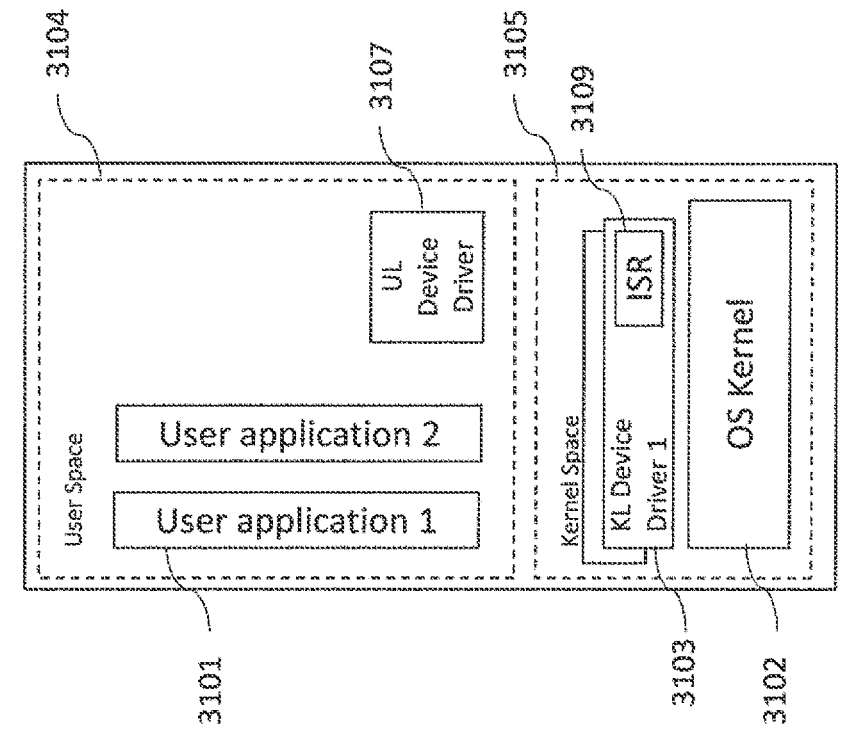
FIG. 3a shows an example overview of an OS layer divided memory space.

Typically in known systems that include IOMMUs, each application 241 (and furthermore each computing kernel being executed on the host processor) operates within its own virtual memory address space. When computing kernel offloading happens the code and/or data are broken into pages and distributed in page frames 205 located in physical memory 111 a non-contiguous fashion. Usually the page frame 205 is 4 Kbytes. Next, the device driver (3103) locates the pages associated with the code and/or data that are to be the subject of the DMA and pins them in physical memory so that the Host OS cannot swap them out. Then, the device driver (for example reference 3103 of FIG. 3*a*) programs directly the co-processor DMA to schedule the access to the code or data of the computing kernels. After this, the coprocessor (103) issues the set of read transactions to load the code, and then a set of read and write transactions accordingly for the computing kernel executions. When the coprocessor has completed the task and written back the possible results an interrupt may be sent to the host CPU to wake up the application to read the result and to carry on the computation.

Where the co-processor 105 has no access to an IO MMU then the address mapping is trivial in the sense computing kernel 252 executed on the co-processors 105 and hence the DMA module work with physical addresses 223. In this case, the code and/or data can be stored in a contiguous fashion into an exclusive memory partition referred as segment 207 outside the physical memory managed by the Host OS. This poses severe restrictions on the design of the accelerator device, the OS and applications. This implies that the application may need to copy the code/and or the data in the segment 207 before any usage from the coprocessor. This consumes Host CPU cycles and memory bandwidth. Next, the device driver 3103 programs directly the co-processor DMA to schedule the access to the code or data of the computing kernels copied in the memory segment 207. After this, the coprocessor 103 issues the set of read transactions to load the code and then a set of read and write transactions accordingly for the computing kernel executions.

When the coprocessor has completed the task and written back the possible results an interrupt may be sent to the host CPU to wake up the application to read the result and to carry on the computation. Another situation is the case that there is no continuous memory partition available. In this case the code and/or data has been stored as the case of IO MMU. Next, the device driver 3103 locates the page frames associated with the code and/or data that are to be the subject of the DMA and locks them in physical memory so that the Host OS cannot swap them out.

After this, the device driver 3103 programs directly the co-processor DMA to schedule the access to the code or data of the computing kernels. In this case the co-processor DMA has to support a scatter/gather feature that allows the transfer in a single operation of data and or code to/from user memory areas that are non-contiguous in physical memory due to virtual memory paging. Setting up the DMA operation incurs some software overhead since the addresses have to be physical addresses and not virtual anymore. During this set-up operation, the DMA engine and accelerator may be idle.

After this, the coprocessor 103 issues the set of read transactions to load the code and then a set of read and write transactions accordingly for the computing kernel executions. When the coprocessor has completed the task and written back the possible results an interrupt may be sent to the host CPU to wake up first the device driver to unpin the pages, and then the application to read the result and to carry on the computation.

Figure 3B:
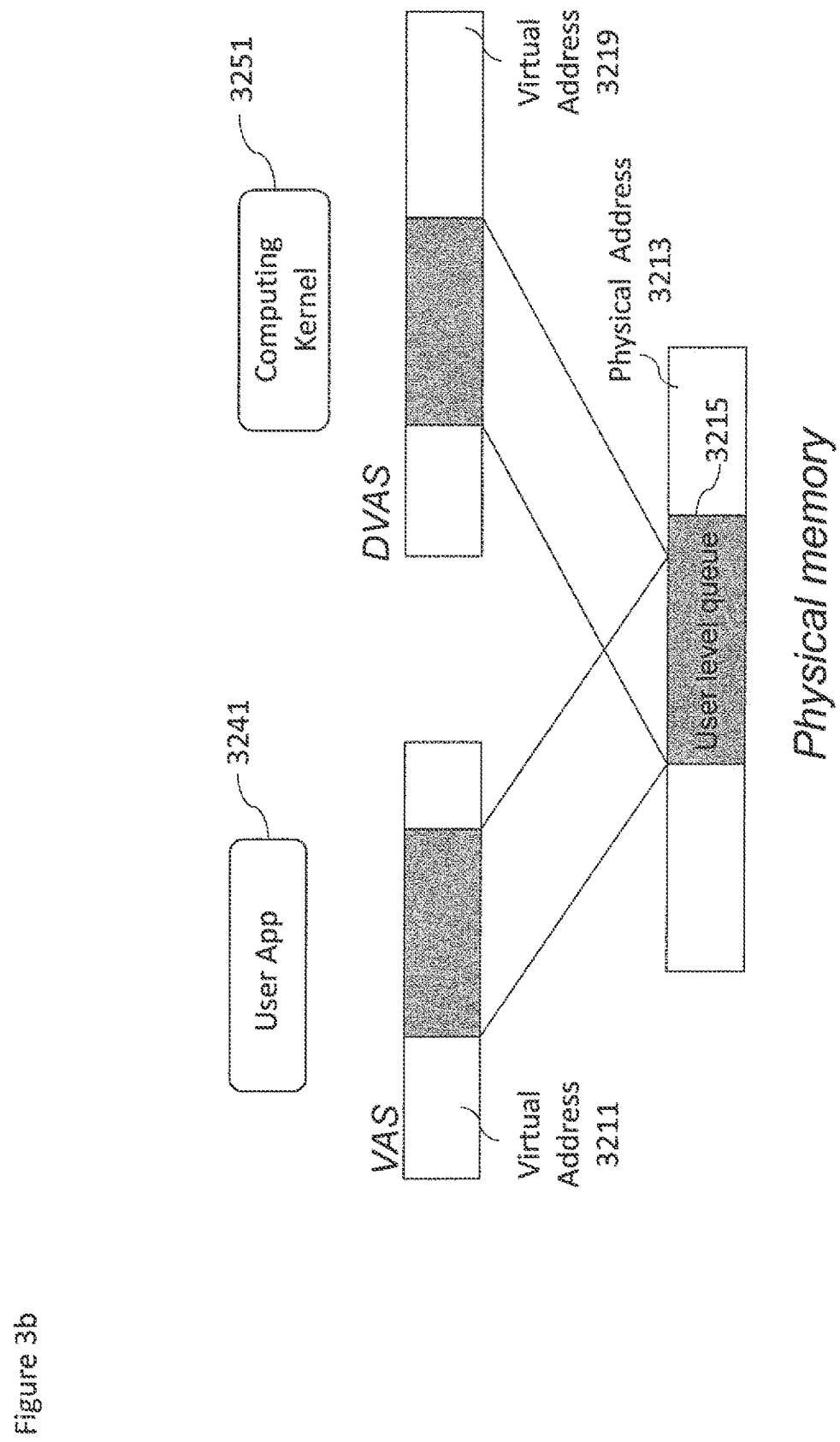
FIG. 3b shows example memory mapping between a virtual address space and physical memory buffer addresses.

The disclosed embodiments are directed to an apparatus and methods for performing computing kernel offloading between a host CPU and a further on-chip and off-chip (discrete) heterogeneous co-processors to address the deficiencies of prior mechanisms described above. The disclosed apparatus and methods allow a co-processor to operate in virtual memory address space. In addition, the disclosed apparatus and methods can enable multiple applications to offload computing kernels at the same time to the same co-processor, thus maximizing the usage of the co-processor. With the disclosed embodiments, the co-processor can access/modify independently data in Virtual Memory also enabling memory consistency and coherency guarantees. In accordance with some embodiments FIG. 3*b* is an example where the user application 3241 associated with user virtual address space 3211 and the computing kernel 3251 associated to a device virtual address space 3219 may share a common physical memory buffer space having a well-defined structure called user level queue 3215.

Figure 3C:
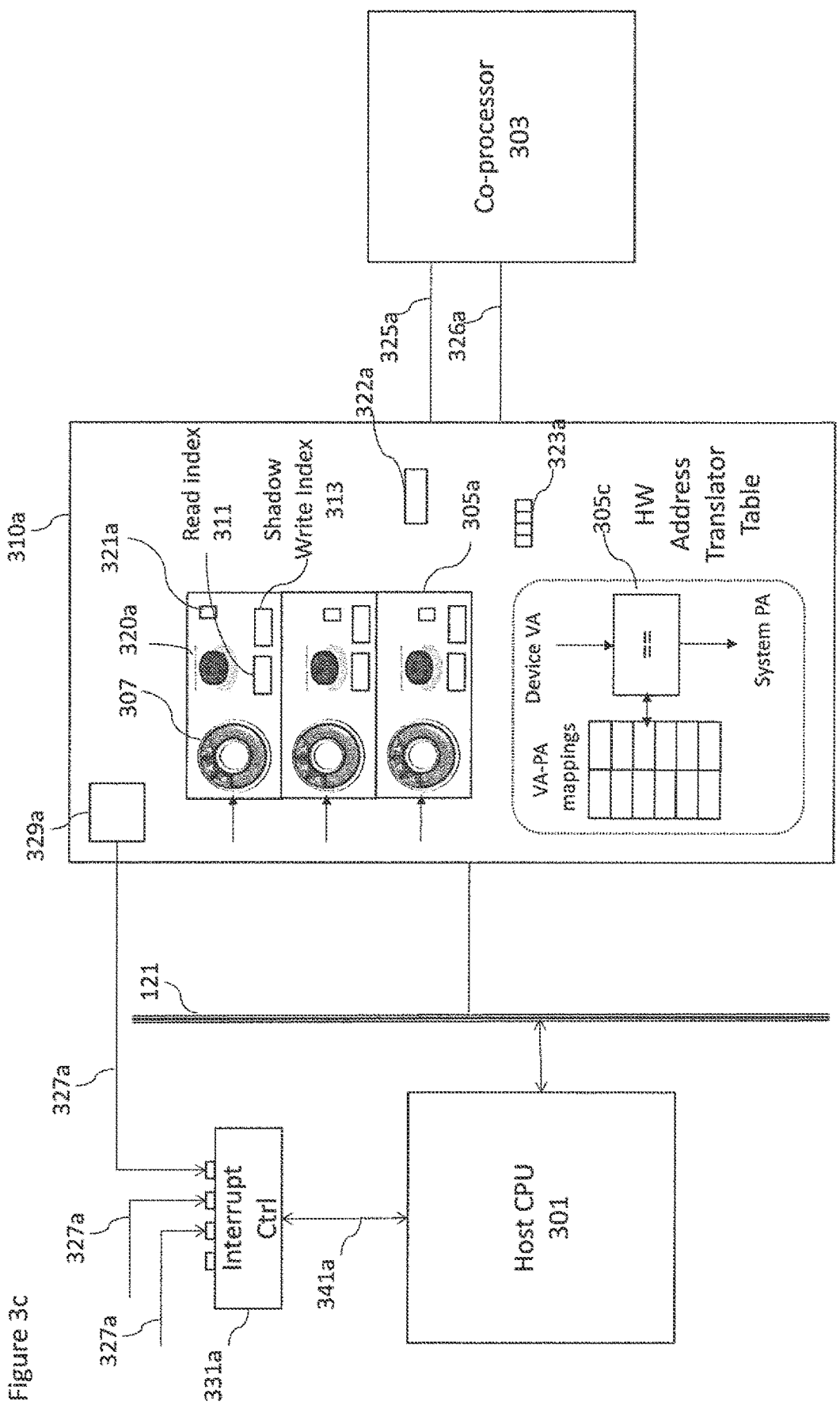
FIG. 3c shows an example overview of a GPPU located between a host CPU and co-processor according to some embodiments.

With respect to FIG. 3*c* an example overview of the Generic Packet Processing Unit (GPPU) 310*a* is shown. In the example shown in FIG. 3*c* a bus 121 and a CPU 301 and co-processor 303 representing just an instance of co-processors 103, 105 or 106 are configured to enable the transfer of computing kernels between each other.

In particular the GPPU 310*a* shown in FIG. 3*c* is a component that may be transparently added to any kind of co-processor. When GPPU is added to co-processors that include an IOMMU then the GPPU can replace the existing IOMMU. The GPPU depicted in FIG. 3*c* enables the dispatch of computing kernels from host CPU to coprocessor 303 (while a similar GPPU may enable the dispatch of computing kernels from coprocessor 303 to Host CPU 301). In the example, GPPU 310*a* may comprise one or more user level queues 3215. Each user level queue structure is a software data structure allocated at runtime and accessible at VAS 3104 having a well-defined size. Furthermore, it is located in page frames 205 managed by the OS kernel 3102 has shown in FIG. 7. The user level queue comprises several entries. The most important are the base address of a circular ring buffer used to store GPPU packets 821, the size of the ring buffer 834, the priority of the queue 832, the address of the doorbell signal 838 as well a shadow read index 823 and a write index 825. The circular ring buffer is implemented as a list of consecutive memory locations that may be the located on one or more page frames 205 managed by the OS kernel 3102.

In addition, there is a part of the user level queue structure that may be duplicated and implemented in hardware within the GPPU containing several registers. The hardware part of the user level queue 305*a*, (also called shadow user level queue) includes the base address of the circular ring 307, and the relative size, a priority value 321*a*, a read index 311 and a shadow write index 313 registers. The read index and write index with the size are used to implement all queue mechanics on the application side as well as on the GPPU side. A GPPU may define for each user level queue a doorbell hardware signal 320*a* implemented as a memory mapped register inside the GPPU that it is used to wake up the GPPU and eventually the co-processor. The doorbell, together with a bit set vector 323*a* denoting the active queues are also implemented in the GPPU.

GPPU packets are located in circular ring buffer 307 mapped into page frames 205 managed by the OS kernel 3102. Each GPPU packet has the same size and well defined format and specifies a command to perform specific tasks on the computing kernel and/or GPPU on the computing kernel. The GPPU packets may include an attribute to identify different types of computing kernel commands for instance dispatch, dispatch & translate, barrier, and initialization. This list is not exhaustive so it can be extended. The GPPU may furthermore comprise a hardware address translator table 305*c* that implements a set of hardware structures and mechanisms as described below in this document, that are programmed by the GPPU itself via the dispatch & translation packet to make the DVAS translation without any overhead compared to known state of the art IOMMU components. In some implementations the GPPU may contain up to several hardware translator tables that may be associated to the code, data and results buffers of the active computing kernel as well as to different page sizes. The active computing kernel is the next kernel that is to be executed on the co-processor. More details are provided later with respect to the example shown in FIG. 8.

The implementation of the GPPU may in some embodiments be configured to store within the dispatch packet computing kernel job information such as memory handles, the whereabouts and length of the computing kernel job object code and data. In addition, an optional result memory handle to store the result of the performed computing kernel job may be also stored within the dispatch packets. In some further embodiments the GPPU may be implemented such that the user level queues maintain the object code and/or data locally (rather than storing the handles/pointers) and thus avoiding a further level of indirection.

The arrangement from a software point of view enables a user application to dispatch directly a computing kernel to a co-processor since user level queues can be mapped on the virtual address space of the application. This is implemented using User Level device driver 3107. The implementation at user level furthermore reduces the OS kernel context switches almost to zero and produces low dispatch times. The implementation of the GPPU arrangement from a hardware view is one which is hardware or microcode controlled. Furthermore the implementation may use hardware scheduling between different shadow user level queues 305*a*. In some embodiments a specially architected queuing language (AQL) such as proposed by the Heterogeneous System Architecture Foundation may be used to describe commands to be performed by the GPPU packets. Moreover, implementation of a GPPU thus furthermore enables hardware managed protection as generally performed by IOMMU.

The GPPU 310*a* may include a hardware module 329*a* to generate interrupts as well as an interrupt request line 327*a*, which may be part of the bus 121. The module 329*a* may be used to send an interrupt request from the GPPU 310*a* to an interrupt controller 331*a* that can be delivered via wires, bus messages or other communication mechanism as known by one skilled in the art.

FIG. 3*c* illustrates a possible example of the delivery mechanisms via wires 327*a*. However, in case of discrete coprocessors the interrupt is generally delivered via bus mechanisms.

Several GPPU components can send interrupts in parallel to the interrupt controller 331*a*. When the interrupt controller 331*a* determines the next interrupt request to be served, it sends an interrupt via the interrupt signal line 341*a* to the Host CPU 301. GPPU interrupts are standard hardware interrupts that as known in the art. They are received by the OS kernel 3102 and serviced by ISR 3109 associated to the GPPU KKDD. The interrupt may be used by the GPPU 310*a* to communicate the termination of the kernel offloading procedure to the application 241 and eventually to wake it up. The communication between the GPPU 310*a* and the associated co-processor 303 may include a completion signal 325*a* to notify to the computation kernel execution has been completed. The completion signal 325*a* may be implemented as a separated physical line or via the local communication interface 326*a* or through any other communication mechanism or protocol. This signal allows the GPPU to move to the next packet and to wake up the application using the wake up mechanism chosen. If the mechanism is based on an interrupt the GPPU using the module 329*a* sends an interrupt request to the associated application indicating the packet identification. Since the co-processor 303 can support multiple parallel executions linked to the same application, the GPPU 310*a* may have a hardware mechanism to do coalescing of completion signals. Thus, the GPPU can combine all these notifications into one single interrupt instead of sending one interrupt per kernel completion.

Figure 3D:
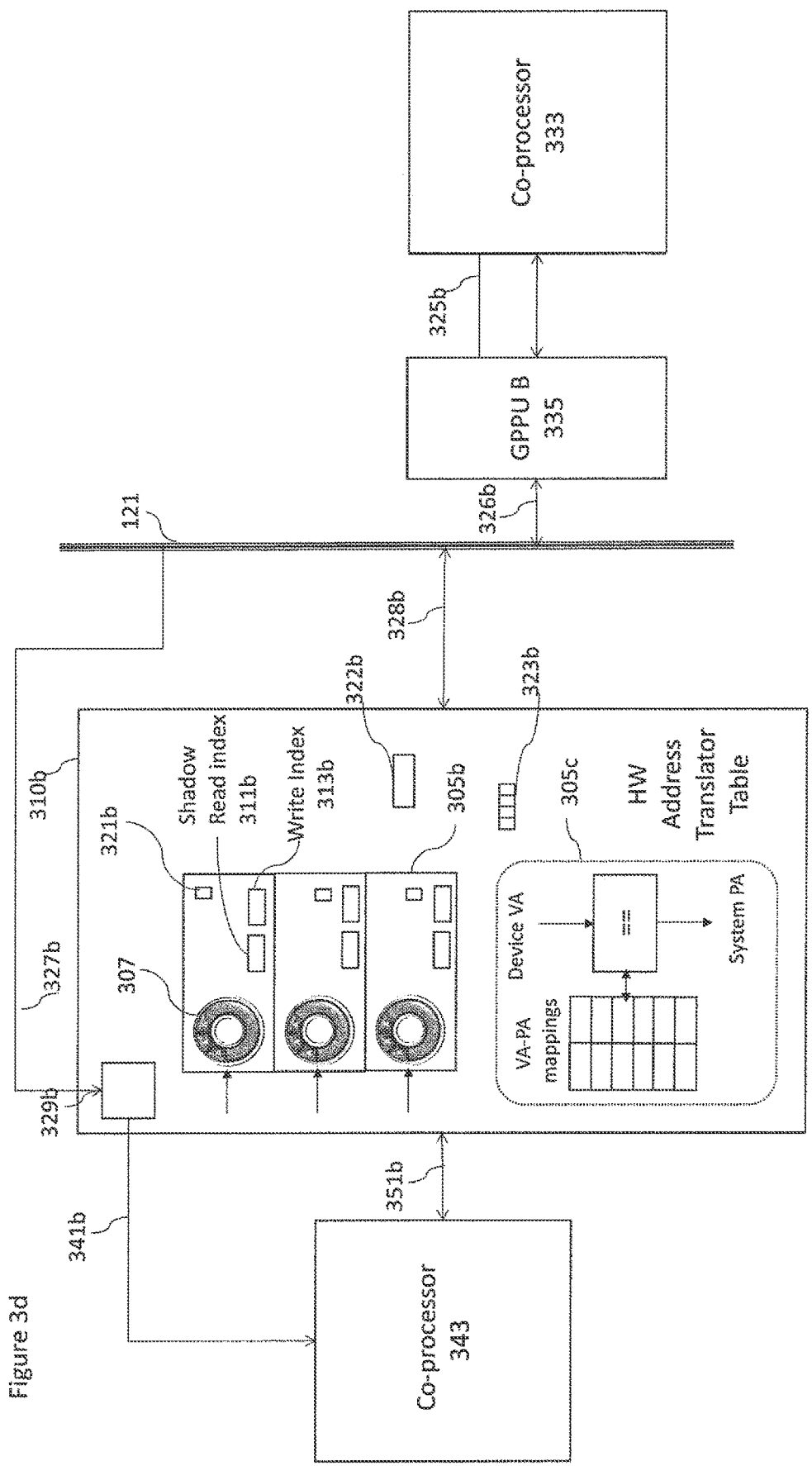
FIG. 3d shows a co-processor to co-processor GPPU arrangement according to some embodiments.

With respect to FIG. 3*d* an example is shown where a direct communication between a programmable co-processor 343 and any coprocessor 333 is possible via two GPPUs 310*b*, 335 connected by a system bus 121. Direct communications between discrete co-processors 343, 333 over the off-chip network 120 shortcuts the host system 1 and allows for high throughput and low latency communication.

FIG. 3*d* illustrates a computing environment in which the GPPUs 310*b* enables the dispatch of computing kernels from co-processor 343 to coprocessor 333. In the example shown in FIG. 3*d* both GPPUs may comprise one or more user level queues as described in FIG. 3*c*. One main difference is that there are no doorbell signals. While the shadow user level queue is implemented in GPPU 335 as described in FIG. 3*c*, the real user level queue in this case is implemented directly inside the GPPU 310*b* with the same functionality. The only difference is the read and writes indexes that in this case are the shadow read index 311*b* and the write index 313*b*. As shown in FIG. 3*c*, GPPU packets are located in circular ring buffer 307 mapped into page frames 205 managed by the OS kernel 3102. The circular ring buffer 307 is shared between the GPPU 310*b* and GPPU 335. In addition, the GPPU 310*b* may include the bootstrap structure as described below. The GPPU 310*b* may include a hardware module 329*b* to receive interrupt requests via interrupt request lines 327*b*. The module 329*b* may be used to receive interrupt signals from the GPPU 335*b* or other GPPUs via physical wires, bus messages or other communication mechanisms as known by one skilled in the art. As illustrated in FIG. 3*d* the GPPU 310*b* receives the interrupt requests from the GPPU 335 via the bus 121 using a single request line 327*b*. When the module 329*b* determines the next interrupt to be served, it sends an interrupt via the interrupt signal line 341*b* to the coprocessor 343. The interrupt may be used by the GPPU 310*b* to communicate the termination of the kernel offloading procedure to the co-processor 343. With respect to FIG. 4*a* an example computing kernel offloading method 400 that employs the GPPU at a co-processor side as shown in FIGS. 3*c* and 3*d* is described in further detail. In accordance with some of the disclosed embodiments, the method 400 illustrates the way to offload the computing kernel to a co-processor by sharing the physical memory managed by the host OS kernel 3102. The method 400 is implemented using the API provided by ULDD 3107. This implies that method 400 can be implemented in any Host OS including the ones having the OS kernel implementation as a close source (no changes or modifications are allowed by a third party), such as Microsoft Windows.

The method 400 begins at step 411, where the application that requires to offload a computing kernel to a co-processor 303 starts with the creation of a user level queue 305*a* using the appropriate API function provided by ULDD 3107. In this API call the size of the queue, together with other information, such as the priority of the queue are also provided. The 411 step is usually performed only once by the application. In some embodiments, the outcome of the step 411 is a Virtual Address VA (referred hereafter as queueVA) within the VAS 243 where the data structure of user level queue is located. This virtual address, queueVA, obtained in step 411, is mapped to a physical address located in one page frame 205 managed by the OS kernel 3102. The ULDD (3107) in the step 411 is responsible to allocate in the system memory the circular buffer that contains the GPPU packets and two pointers called: shadow read index and write index. In order to prevent the host OS to release the allocated memory and being reused by another processor the ULDD 3107 pins the memory pages where these elements have been allocated. In addition, the ULDD 3107, within the step 411, reserves one of the hardware queues 305a in the GPPU and initializes the read index 311 and the shadow write index 313 and set the bit vector.

In this implementation the GPPU starts with an empty address translation table 305c.

At step 413, the application gets via the queueVA obtained in 411, the actual write index and read index calling the appropriate functions of the ULDD 3107 API. The implementation of ULDD API varies depending on the specific type of memory model (weak, strong).

At step 415 the application, using the read and write indexes, checks that the queue is not full before writing the GPPU packet. If the queue is full it enters in a wait cycle looping on step 415.

At step 417, the application gets the base virtual address (bufferpkVA) within the VAS (243) of the circular buffer where the GPU packets are stored. The bufferVA can be obtained reading the attribute of the user level queue structure referenced by queueVA obtained in step 411. Then, the application gets the virtual address of the GPPU packet by adding to pkVA the value of the write index.

At step 419, the application initializes the GPPU packet referenced by virtual address pkVA. Calling the ULDD, the application, starts setting the packet type while the remaining steps varies depending on the specific GPPU packet type and the location of computing kernel code and/or data and results. If we assume a GPPU dispatch packet or dispatch & translate packet, the application stores the 3 handles in the packet located in the pKVA address. The handles are one related to computing kernel code, one related to computing kernel data and one related to computing kernel results. Each handle is defined by its base virtual address and integer representing the relative length in bytes. In addition, the identifier of the application to be woken up is also stored in the packet. The above mentioned handles can be obtained by a new memory allocation in user space using any standard host OS memory allocation function, or it may be any exiting kernel buffer allocated by a device driver and shared with the application. For instance, the kernel buffer can be managed by the hard disk device driver to copy the file contents via a DMA engine, thus removing the necessity to copy the buffer between the kernel and the user space spaces.

Sharing the virtual memory there is no more need for the application to copy the data from a buffer location in a virtual memory to another location accessible to the co-processor.

At step 421, the ULDD checks if the type of current packet is a dispatch & translation packet. If the answer is yes the method carries on with step 423, otherwise, the method jumps to step 425.

At step 423, the ULDD (3107), for each handle, makes a call to a kernel space driver KLDD 3103 of the host OS to create a list of physical frame addresses. In Linux this is implemented by ioctl call while in Windows by the DeviceIoControl. The KMDD 3103 allocate a contiguous area in memory where it stores all translation entries. These translation entries are the one that will be stored by the GPPU on the HW translation tables. In most of the case all these entries can be stored in a single page frame. Since each handle can span on different page frames, the allocated area contains all physical base addresses of these page frames, accordingly, the entry format. The output of the KLDD is the physical address (PA) and Virtual address (VA) of the allocated memory area. Both PA and VA addresses, referred as bootstrap translation address, are stored by the ULDD in a bootstrap translation structure 450 that stores for each handle the last bootstrap address related to a specific process identifier. This means that for each PID the structure may store up to 3 bootstrap addresses related to code, data and results.

At step 425, the ULDD checks if for each handle the bootstrap address is contained in the Bootstrap translation structure. If the answer is yes the method carries on with step 427, otherwise it jumps to step 431. An example bootstrap translation structure is shown in FIG. 4b where the structure comprises entries of process ID, bootstrap address translation (from VA to PA), and length.

At step 427 it is similar to step 423. The only difference is that it is called to the handles that have no bootstrap address.

At step 431 the ULDD finalizes the initialization of the packet storing (for each handle) the bootstrap address obtained from the bootstrap translation structure into the current packet. The bootstrap address is used by the GPPU to bootstrap the filling procedure of the hardware address translation tables 305c that are required to access the code, data and results of the computing kernel.

The bootstrap translation structure will be used later on by the ULDD unpin and to free up the allocated memory related to the translation. In this case the corresponding entry will be removed from the table.

At step 433, the application rings the doorbell signal calling a specific function of the ULDD 3107 and providing the identification of the queue obtained in 411.

At step 435, the application waits the completion of the computing kernel offloading. The wait is generally implemented using any of the synchronization mechanisms provided by the Host OS. In order to resume the application the GPPU uses one of wake up mechanisms that is known by those skilled in the art. If the interrupt mechanism is used the GPPU uses the module 329a to send the interrupt request. In this case the application will be woke up by the ISR and the device driver.

At step 437, the application is finally resumed and the obtained results can be accessed via the VA provided in step 419. When the result has been used the related physical pages may be unpinned using an ULDD API or directly by the application.

Eventually the application can iterate the process looping back and executing the step 413.

The method described in FIG. 4a may be applied to the example illustrated in FIG. 3d. In this case, the application may be executed by the co-processor 103. As shown in some of disclosed embodiments the steps 423 and 427 may still be executed by the Host CPU. In addition, the wake up operation at step 419 may be implemented by any technique known in the art for waking up the specific co-processor.

Figure 4C:
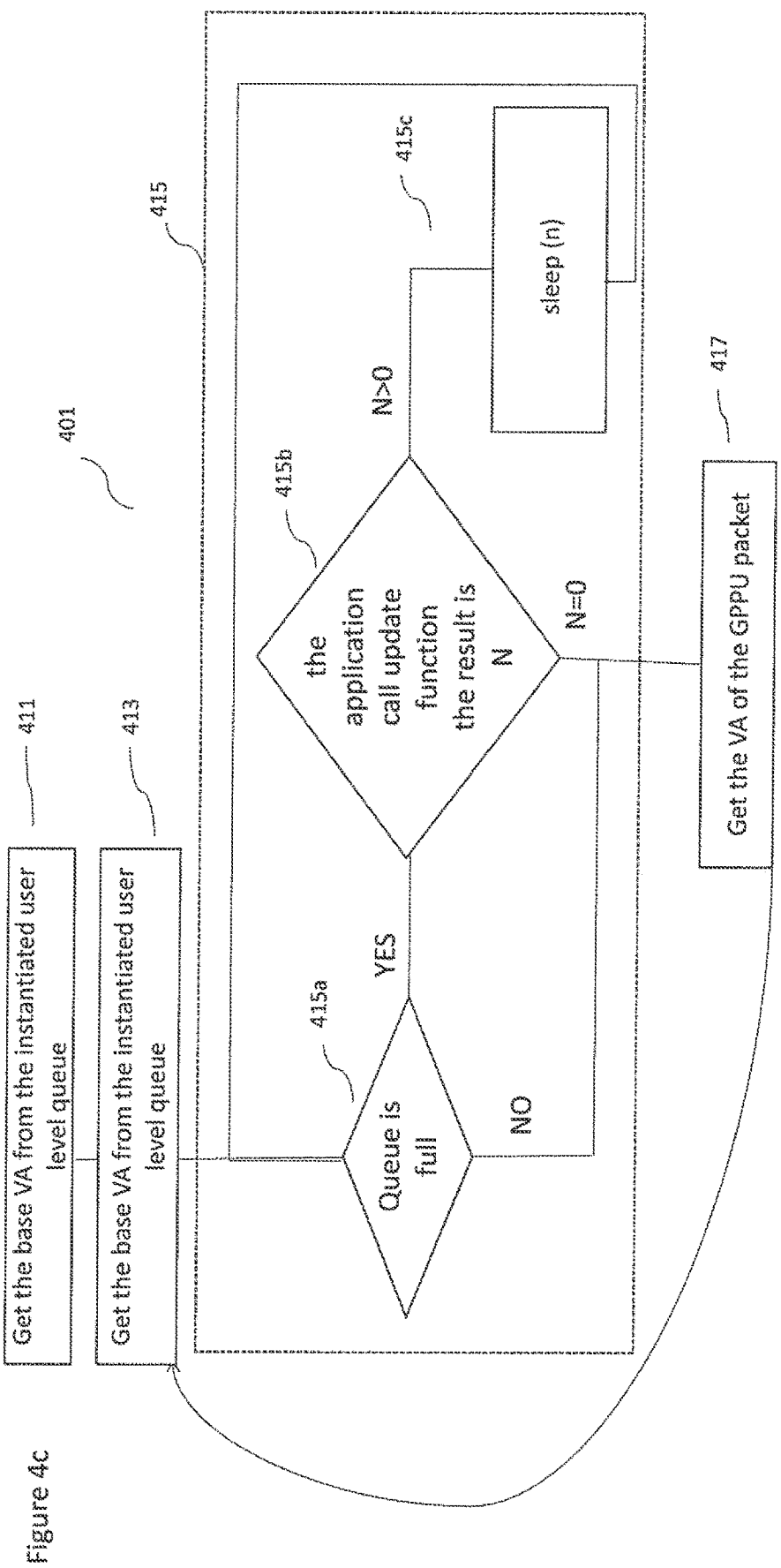

With respect to FIG. 4c an example computing kernel offloading method 401 that employs the GPPU at a co-processor side as shown in FIG. 3c is described in further detail. Compared to the method 400 it provides an optimization in case of a full queue. In accordance with some of the disclosed embodiments, the method 401 illustrates the way to offload the computing kernel to a co-processor by sharing the physical memory managed by the host OS kernel 3102. The method 401 is implemented using the API provided by ULDD 3107. This implies that method 401 can be implemented in any Host OS including the ones having the OS kernel implementation as close source (no changes or modifications are allowed by a third party) such as Microsoft Windows.

With respect to FIG. 4c the method 401 differs from the method 400 in that the step 415 comprises or is replaced by the steps 415a, 415b, and 415c. At Step 415a, the user application checks if the queue is full. If it is not full the application carries on its execution according to step 417. Otherwise, if the queue is full the application executes the step 415b.

At step 415b the application calls the update function provided by the user level device driver. When the user level device driver executes the update function, it requests the current value of the read pointer located in the GPPU 310a by issuing a read transaction on the bus having the memory mapped address of the read index register. The GPPU provides the current value of the read index and it also adds a coded integer that defines the mean time of computing kernel execution. The GPPU provides also the average number of clock cycles necessary to execute a computing kernel. In one implementation instead of providing the value, the exponent can be provided. The base is generally 2. When the user level device driver receives the read index it updates the shadow read index, and if there is a free space the value of 0 is returned. If the queue is full it computes the elapsed waiting time using the exponent received and the related base.

If the value returned by the user level device driver via the update function is 0, the application may carry on its execution according the step 417. Otherwise, the value returned is any positive number with the step 415c.

At step 415c, the application goes to sleep before re-iterating with the step 415a. In one implementation the sleep time is the result of the number of clock cycles multiplied by the application defined conversion factor.

Figure 4D:
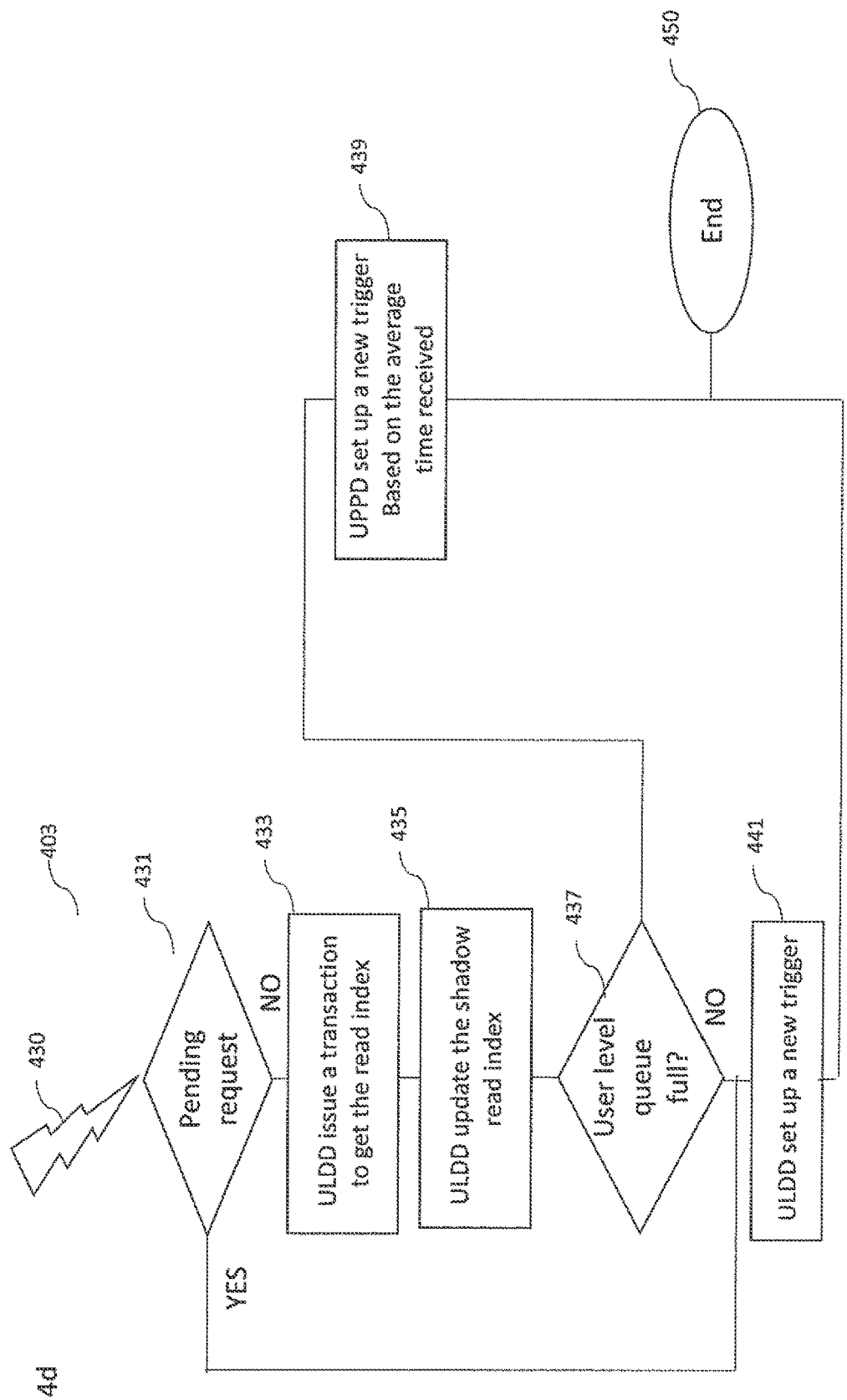
FIG. 4d shows a flowchart of a method implemented by the ULDD for managing the update of read and write indexes.

With respect to FIG. 4d an example how the ULDD can update periodically its shadow read index in a unified system memory to reduce the possible overheads is provided. The method 403 can be used in combination with the method 400 or 401.

The method 403 starts at step 431 when the ULDD is self-triggered by a well-defined condition that can be selected among the following: trigger happens when a block of packets have been consumed; trigger happens when the free space is smaller than a specific target; or trigger happens when a timer expired.

At step 431 the check of pending requests (due to the step 415b), is performed. If there are pending requests the method carries on executing the step 441. Otherwise, the step 433 is executed.

At step 433 the ULDD requests the current value of the read pointer located in the GPPU 310a by issuing a read transaction on the bus having the memory mapped address of the read index register. The GPPU provides the current value of the read index and it also adds a coded integer that defines the mean time of a computing kernel execution.

At step 435 when the user level device driver receives the read index it updates the shadow read index.

At step 437 the ULDD checks if the queue is full. If it is not full the step 441 is executed. Otherwise, if the queue is full the step 439 is executed.

At step 439 the user level device driver sets up a self-timer using the mean time of computing kernel execution. In this way, when method 403 is re-executed the read index stored on the GPPU has a different value. Then the method carries on with the step 450.

At step 441 the user level device driver sets up a new trigger. The method 403 finishes at step 450.

Figure 5:
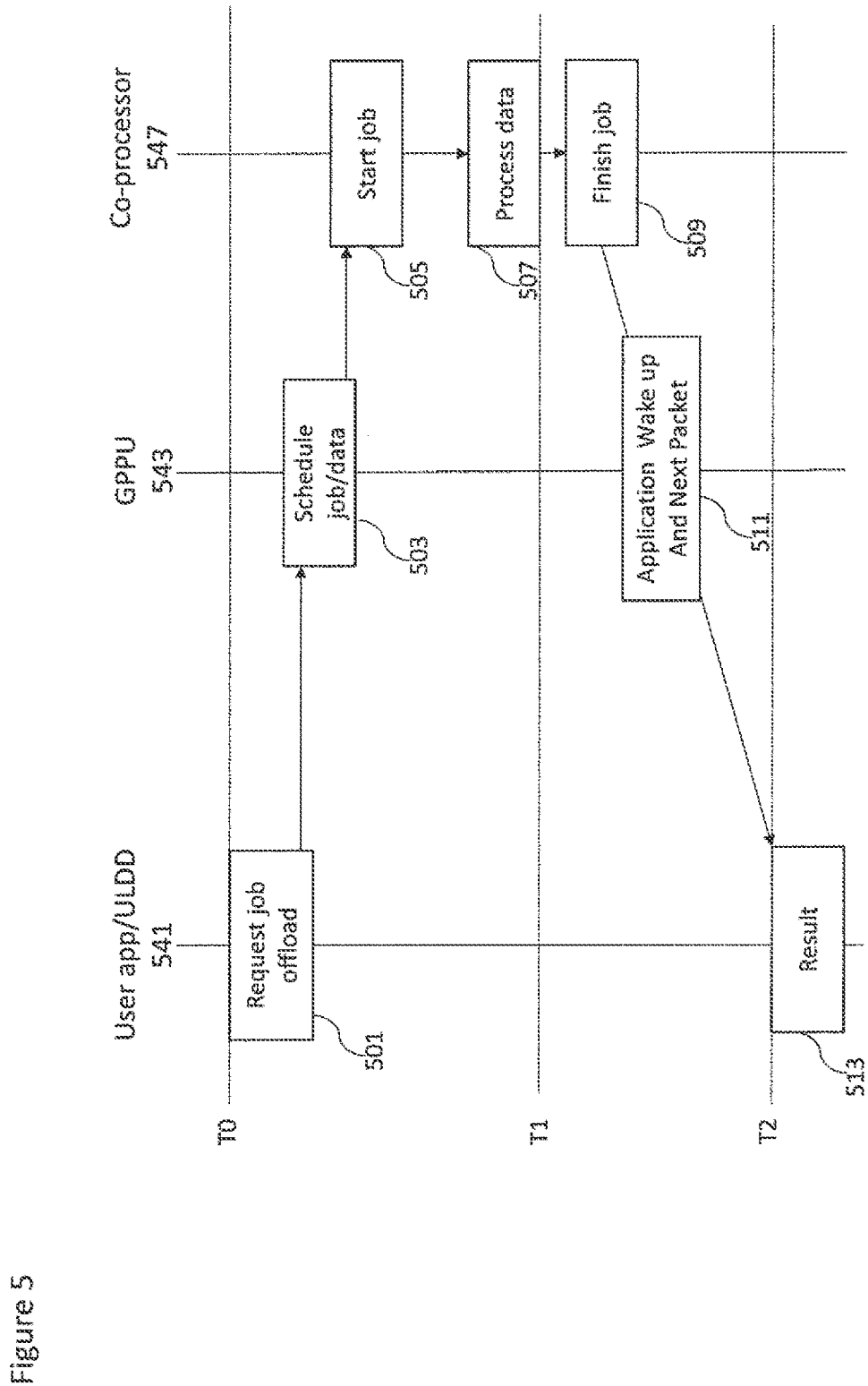
FIG. 5 shows a more detailed flow diagram of the operations of the GPPU with no timer as shown in FIGS. 3c and 3d.

With respect to FIG. 5 a further example flow diagram of the operations for computing kernel job offloading between a user application 541, for example running on a host CPU, and kernel 547, for example running on a co-processor via the GPPU 543, is shown in further detail.

For example, at a first-time instant T0 the user application 541 can be configured to request a computing kernel job offload.

The operation of requesting the computing kernel job offload is shown in FIG. 5 by step 501. This operation implies first the GPPU packet allocation and then the packet set up using the API provided by user mode device GPPU driver 3103. When the dispatch GPPU packet has been set up with all necessary information that includes the memory handles to computing kernel code and/or data and the optional results, a specific doorbell signal 320a will be rung. Ringing the doorbell allows the packet to be schedulable by the GPPU 543. In addition, it may activate the GPPU if was in a sleep state or in a low power state The operation of scheduling the job/packet is shown in FIG. 5 by step 503.

The GPPU 543 de-queuing from the hardware queues 305a and depending the type of the packet, it performs the specify activity. In case of a Dispatch packet 307 the GPPU passes the memory handles to the associated co-processor 547 via physical wires or other communication mechanisms as known by those skilled in the art. As defined memory handles specify the start address and the length for each segment where computing kernel code and/or data result buffer are located.

Next the co-processor can start to load the computing kernel code (if required) then can start to perform the read operations on the memory segment where data are located and write operations to the memory segment where result buffer is located.

The operation of starting the job is shown in FIG. 5 by step 505. The kernel may then process the data. The operation of processing the data is shown in FIG. 5 by step 507.

The kernel may finish the job at a time instant T1 and then stores a result on the segment denoted result buffer. The result buffer may comprise an identifier identifying the processed data result.

The operation of finishing the job is shown in FIG. 5 by step 509 where the coprocessor notifies the GPPU via the completion signal 325a.

The step 511 is executed when the end job notification from the co-processor has been received. In this step GPPU may schedule the next packet and the application will be woken up by sending and interrupt or using any other method known by those skilled in the art. This denotes that the dispatch have been completed. As already mentioned, the application wake up includes waking up the ULDD and then the application. When the ULDD has been woke up, it unpins the allocated pages associated with the bootstrap addresses related to code, data and results and it also removes the corresponding entries from the bootstrap translation structure. In another implementation to unpin the memory pages can be requested explicitly by the application once it has been woken up.

The user application may then read, at a time instant T2. The result via the handle result buffer is stored initially on the dispatch packet. The operation of determining a result is shown in FIG. 5 by step 513.

Figure 6:
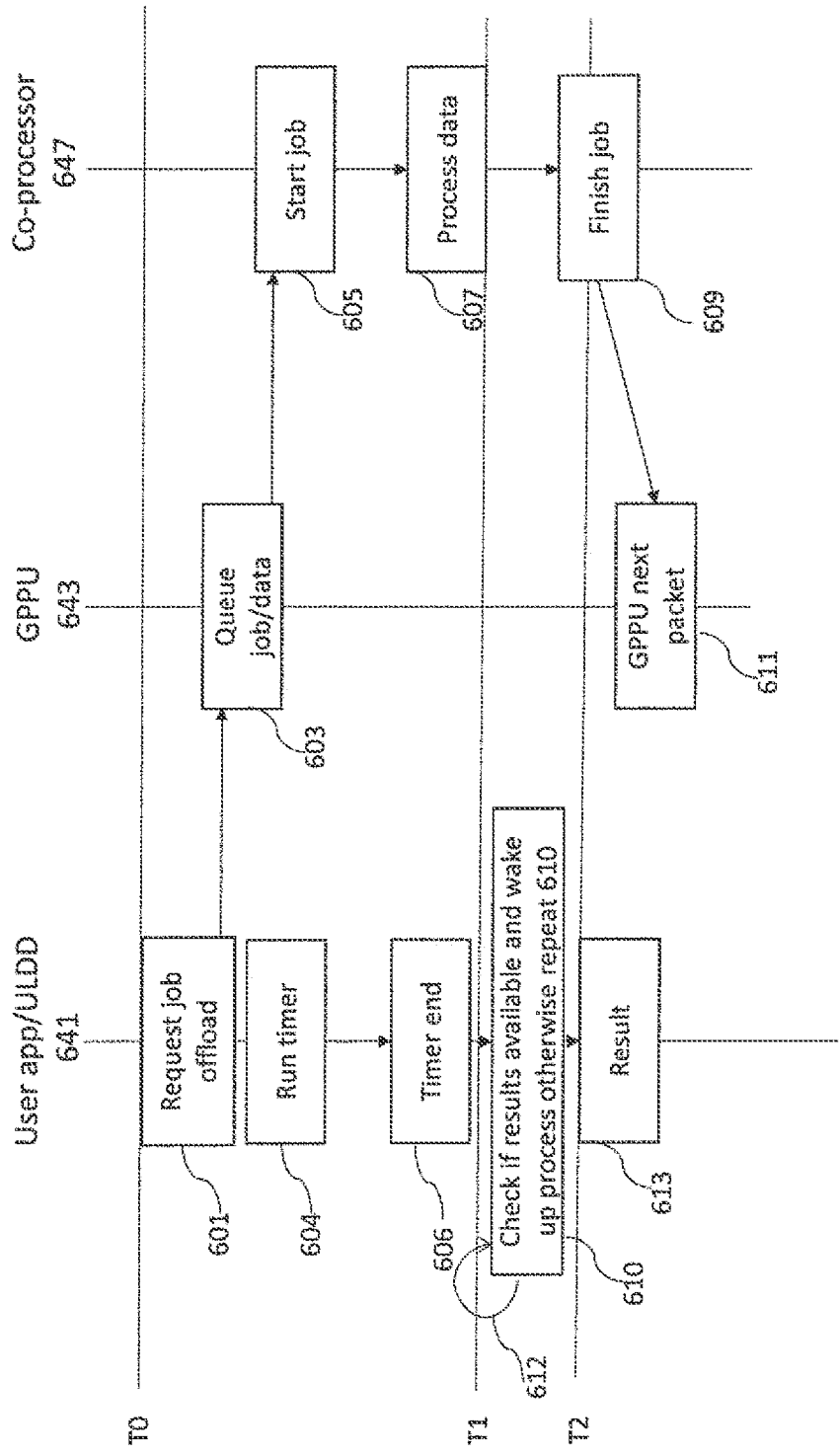
FIG. 6 shows a flow diagram of the operations of the GPPU with a timer as shown in FIGS. 3c and 3d.

With respect to FIG. 6 a further example flow diagram of the operations for computing kernel job offloading between a user application 641, for example operating on a CPU, and kernel 647, for example operating on a coprocessor via the GPPU 643, is shown where a timer may be implemented.

For example at a first-time instant T0 the user application 641 can call the ULDD to request a job offload.

The operation of requesting the job offload is shown in FIG. 6 by step 601. Next is the operation of requesting a job offload.

This operation implies first the GPPU packet allocation and then the packet set up using the API provided by user mode device GPPU driver 3103. When the dispatch GPPU 643 packet has been set up with all necessary information that includes the handles to computing kernel code and/or data and the optional handle related to the buffer where to store the results, the doorbell signal 320a will be rung (activated) by the application. Ringing the doorbell allows the packet to become schedulable by the GPPU 543. In addition, it may activate the GPPU if it was in a sleep state or in a low power state.

The operation of scheduling the job/packet is shown in FIG. 6 by step 603.

The GPPU 643 de-queuing from the hardware queues 305a and depending on the type of the packet it performs a specific activity. In case a Dispatch packet passes, the memory handles to the associated co-processor 647.

This operation of starting the job is shown in FIG. 6 by step 605. The kernel may then process the data. The operation of processing the data is shown in FIG. 6 by step 607.

During the processing the GPPU may then queue the result before passing the result packet to the user application.

The kernel may finish the job at a time instant T1 and then it stores the result in the result buffer. The result buffer may comprise an identifier identifying the processed data result.

The operation of finishing the job is shown in FIG. 6 by step 609 where the coprocessor notifies the GPPU via the completion signal 325a. The GPPU once that has been notified can start to schedule the next packet at step 611.

In some embodiments just after the step 601 the ULDD may set a timer. The operation of running a timer is shown in FIG. 6 by step 604. The timer may end. The operation of the ending of the timer is shown in FIG. 6 by step 606.

The timer having ended enables the ULDD, at step 610, to check whether there is a result packet waiting with respect to the offloaded job. If the result is available the application is woken up by the ULDD using the standard Host OS synchronization services. Otherwise, the ULLD can start to poll 612 the availability of the result.

Figure 7:
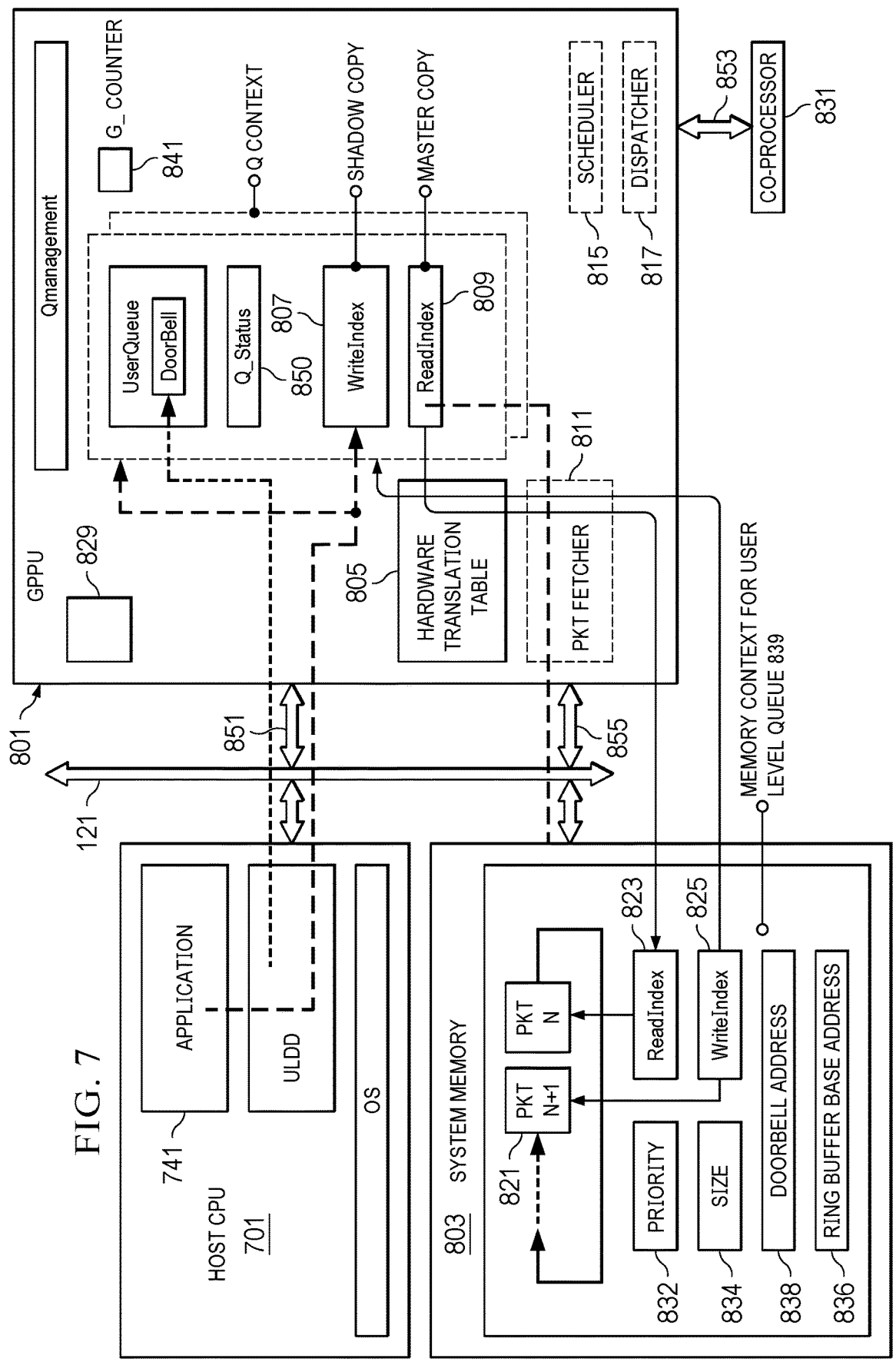
FIG. 7 shows an example GPPU implementation.
Figure 8:
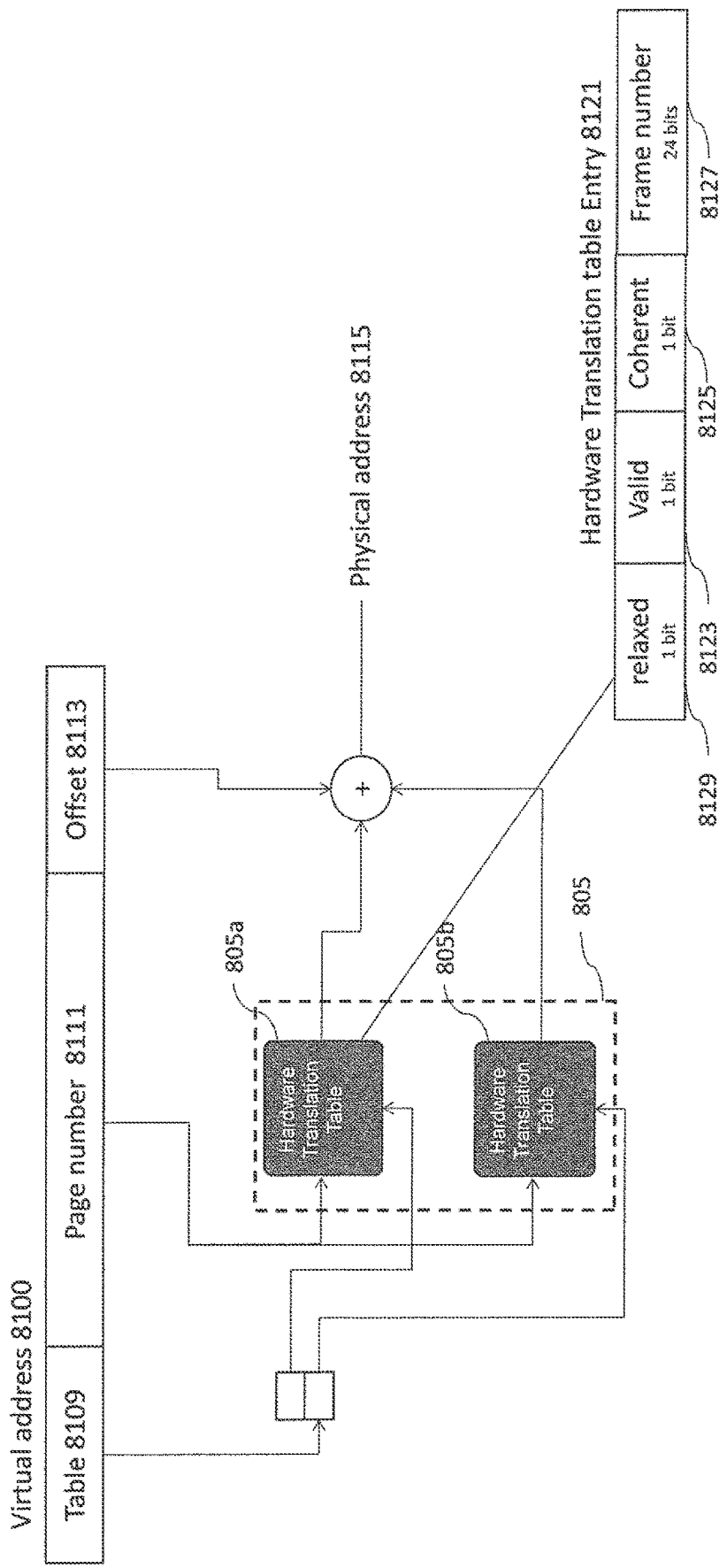
FIG. 8 shows a detail of the example GPPU implementation shown in FIG. 7.

With respect to FIGS. 7 and 8 a detailed example of a GPPU 801 implementation, including the hardware part, as well the software part within a system memory 803 operating with the hardware translation module (805) is shown. The GPPU 801 comprises a shadow user queue controller for each user level queue. The shadow user queue controller comprises a series of registers and hardware blocks such as Q_status 850, the shadow copy of the WriteIndex 807 and the real ReadIndex 809, an interrupt generation module 829, a packet fetcher/requester 811, a job scheduler 815 and a packet dispatcher 817. The packet fetcher 811 is used to access the memory 803 and eventually to fill the hardware transaction table starting from the bootstrap addresses stored in the active packet. The Packet scheduler 815 selects and dequeues the next active packet accordingly using priority based arbitration schemes well known in the art. The Packet dispatcher 817 is responsible to communicate to the coprocessor the handles to enable the kernel offload in case of dispatch or dispatch and translate packets and to manage the communication between GPPU and coprocessor 831 that includes DMA requests and kernel completion signal.

In some embodiments, when the GPPU receives a new doorbell signal, the GPPU may be waked up if it was in a sleep state, then the Scheduler 815 is executed. Then, accordingly the active packet type and the features of co-processor 831, the GPPU, may perform some specific operations as mentioned below. Finally, it may loop back or may go in sleep mode.

In some example embodiments, when a new active packet having been selected from the scheduler 815 is a dispatch & translate packet, the GPPU 801 using the bootstrap info included in the active packet, may start to update the Hardware translation table issuing several read bus transactions via the packet fetcher 811. In parallel it can communicate to the coprocessor 831, via the dispatcher 817, the handles stored in the active packet to enable the computing kernel offload. Accordingly, the type of co-processor can start to load the code or just execute the hardwired functionality. In both cases the coprocessor starts to issues issue a series DMA bus requests via the communication interface 853.

In some other embodiments, when a new active packet having been selected from the scheduler 815 is a dispatch packet, the GPPU 801 can communicate directly to the coprocessor 831, via the dispatcher 817, the handles stored in the active packet enable the computing kernel offload. Accordingly, the type of co-processor can start to load the code or just execute the hardwired functionality. In both case the coprocessor starts to issue a series DMA bus requests via the communication interface $8_{53}$.

In some other examples when a new active packet has been selected from the scheduler 815, the GPPU 801 will not launch any further packets until some conditions specified by the packet semantic are met.

In some embodiments, when GPPU 801 receives a DMA read or write request from the coprocessor 831 the dispatcher 817 may forward the request to the packet fetcher/requester 811. The packet fetcher/requester compares the virtual address identified in the DMA request with entries of Hardware translation table 805 to obtain the related physical address and the type of DMA access: relaxed 8129, coherent 8125. Using the physical address the bus DMA request may be performed, and finally the outcomes can be provided to the co-processor 831 via the dispatcher 817. In other embodiments when the GPPU 801 receives the notification the computing kernel offload has been completed via the completion signal, the GPPU 801 may perform the corresponding tasks according to FIGS. 5 and 6.

The GPPU share with the application 741 and the memory context data structures 839 stored in the system memory 803 to previous descriptions and as shown in FIG. 7. The memory context for the user level queue 839 may include a circular buffer implementation of a packet queue 821 (shown by Pkt N+1 and Pkt N) and a read 823 and write 825 index and queue size 834 for implementing the queue mechanics, the base address of the ring buffer 836, the address of the corresponding doorbell 838 and the priority 832.

The GPPU 801 may include a global counter 841 used to compute the average execution time of the kernel. In one implementation the global counter starts to be incremented every 'n' clock cycles by the GPPU when a new packet has been dequeued by the dispatcher. The 'n' value is generally one of 2, 4, 8, 16, 32 . . . .

The incrementing phase ends when the GPPU receive the completion signal from the coprocessor. In one possible implementation the average time is computed by shifting by 2 the global counter.

Although the GPPU includes the standard programming port 851 to support the standard memory map operations, as described in some embodiments it may use a high performance bus port 855, to access the system memory 803 and to reprogram itself after the completion of a kernel offloading procedure. This implies that each reprogramming activity is performed in a very efficient way.

In some embodiments the GPPU 801 may update its internal copy of the shadow write index stored in a register by a read bus transaction performed by packet fetcher 811. Using a read bus transaction, the packet fetcher reads the actual value of the write index from the System Memory 803 enabling the update of the shadow write index.

In some embodiments, in order to avoid incurring some overheads due to the update of both read and write shadow pointers by the scheduler 815 in a unified system memory, the GPPU 811 may mitigate the overhead by updating these registers when a block of commands have been consumed (for example, by grouping packets) rather than updating on each scheduler 815 dequeue operation. Furthermore, by only updating in the GPPU when the free space is small (in other words the queue is nearly full) the system can update its copy of the shadow write pointer by issuing a read bus operation from the unified memory.

According to some embodiments, FIG. 8 illustrates a possible implementation of virtual to physical GPPU address translation. According to one embodiment, the Hardware translation table 805 may support different page sizes in system memory 803 and/or split translation tables. This implies that the translation of the virtual address 8111 may depend upon the page size. For instance, ARM architecture defines 2 sizes: the 4 KB and 64 KB pages. In one possible implementation each memory buffer handle will be associated to only one size. The association between memory handle and page size is done in at the initialization phase.

As depicted in FIG. 8 a virtual address 8111 representing on address within the continuous virtual memory space is identified by the memory handles managed by the co-processor. This virtual address 8111 can be split in a table 8109, a page number 8111 and an offset 8113. The table portion 8109 is used to select the hardware translation table to be used for the translation. This means one implementation table can be associated to a different page size, and another implementation table may be associated to different handles. The page number 8111 portion is used to get an appropriate entry 8121 from the selected Hardware translation table 805*a* or 805*b*. As shown in FIG. 8*b*, an example of entry covering 4 Kbyte frames is provided. In this example, the entry is composed by 4 fields: a relaxed bit 8129, a valid bit 8123, a coherency 8125 and a frame number 8127. The valid bit, the relaxed bit and the coherency may be 1 bit wide while the frame number may be 24 bits wide. It is understood that the 24 bit wide frame number is an example only and may be any suitable number of bits wide.

The valid bit 8123 indicates whether the entry is valid or not. If the entry is valid it can be used for the translation, otherwise an error is produced.

The relaxing ordering bit 8129 indicates whether it is allowed that the completions from different bus requests have no ordering rules. In other words, if the GPPU issues a read transaction with the Id set to one, and then another read transaction with the tag set to zero, it is possible that a completion of the second transaction (with id set to 0) will arrive before the first one (with tag 1).

The coherency bit 8125 is set, to indicate maintaining coherency and consistency of data passed between the co-processor and one or more Host CPUs. Reads and writes from the co-processor may be treated in a coherent manner by the packet fetcher 811 as they issue through the bus interface 855 and then they are routed through the system bus 121 to the coherence manager and into the optional L2 cache or to the system memory. The coherence manager might or might not keep coprocessor transactions coherent with L1 caches. Without L1 cache coherency, the coherence manager steers I/O transactions directly to the L2 cache, and software must manage the L1 cache coherence. However, because both host CPUs and co-processors access the L2 cache, coherence is implicitly maintained for data stored there. Generally, discrete co-processor 106 using the PCI protocol are always done coherently.

The value of the frame number 8127 table identifies a page frame in system memory 803. Therefore, from the entry contained within the selected Hardware translation table it is possible to identify a page frame in system memory 803. In order for the packet fetcher 811 to obtain the physical address 8115, the page frame identified by the Hardware translation table is combined with the offset 8113 from the virtual address 8100.

Figure 9:
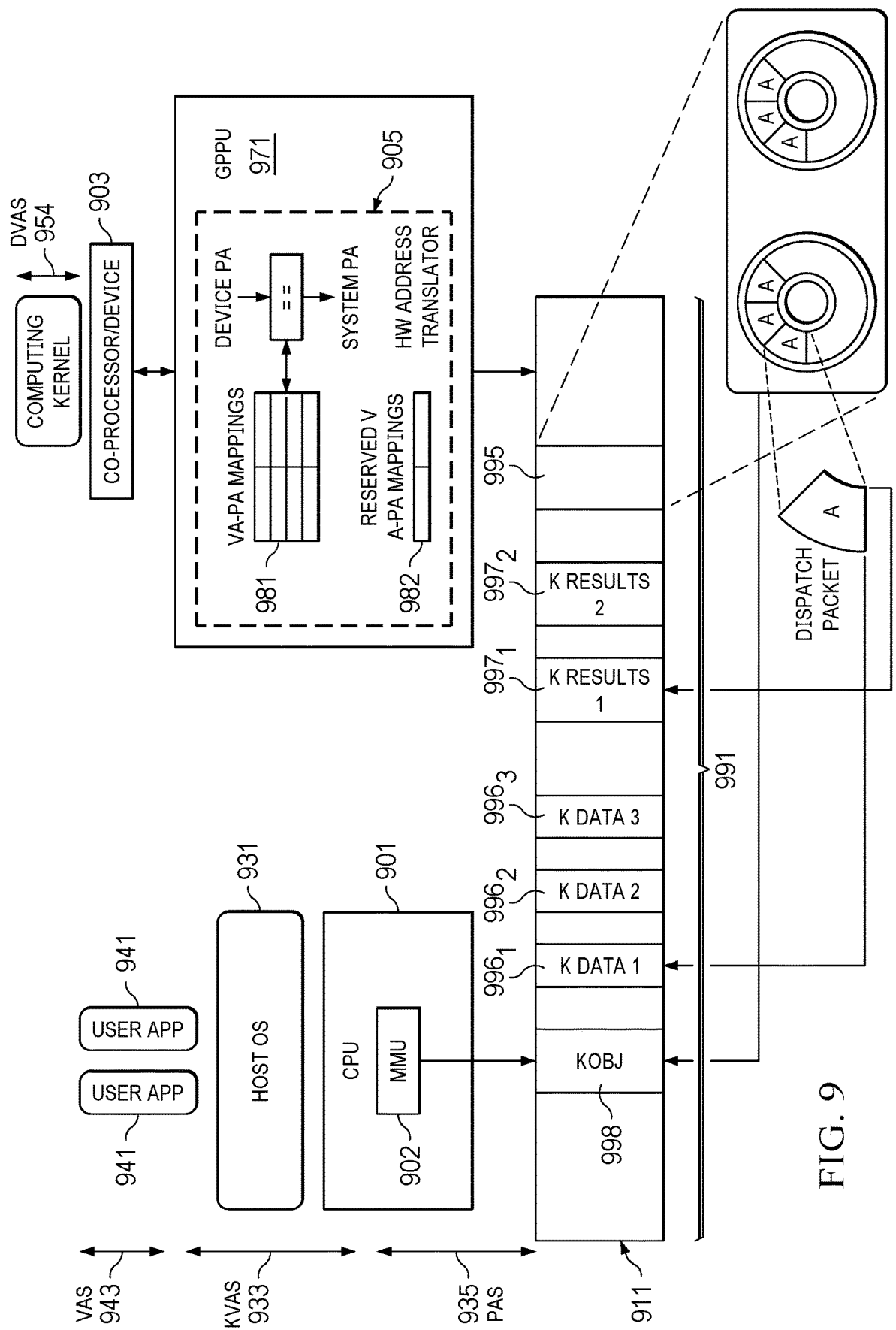
FIG. 9 shows a further example shared memory transfer or kernel offload between a CPU and device using a GPPU arrangement according to some embodiments.

With respect to FIG. 9 a further example user level computing kernel dispatching is shown using a GPPU that includes a hardware translation table that implements the virtual to physical translation. In this example a virtual shared memory system is employed. This operates in accordance with virtual Host OS memory address translation. In the example shown in FIG. 9 the CPU MMU 902 enables the CPU 901 to translate virtual addresses, such as an address within an application virtual address space (VAS) 943 from the user application 941, into physical addresses which can be output onto the memory bus to access the memory 911.

In a similar manner the co-processor 903 can access the memory 911 using DVAS 954. Then the GPPU can make the efficient translation to physical address via the GPPU controller 971. Some embodiments such as shown in FIG. 9 split the VA-PA mappings in a section that can be updated any time and a reserved section that can be updated only at the initialization time.

The non-reserved part of the hardware translation table contains the translations required by the current GPPU packet while the reserved part contains all translations that are always required independently of the GPPU packets. Splitting the translation table reduces the time to upload the hardware translation table since it is done in parallel.

As described previously in some embodiments the memory 911 is a shared physical memory managed by the Host OS. The shared physical memory 111 some embodiments, such as shown in FIG. 9, comprises a set of page frames managed by the OS. The size of these pages is defined by the OS. Since the GPPU includes a virtual to physical translation block 905 the shared physical memory can be shared also with the co-processor 903. Some virtual pages may be allocated by the application before the computing kernel offload phase and filled with kernel objects (instruction code) such as shown in physical space (kobj) 998 and kernel data (processing data) 996. At the application level the allocation is done with standard OS primitives such as malloc or other specialized primitive defined by the Host OS. This means that the allocation is done at user space. The computing kernel objects and computing kernel data, as shown, are located in several physical pages (kdata1) 996$_1$, (kdata2) 996$_2$, (kdata3) 996$_3$. This is the case when the size is larger than the physical page size. The application may allocate also the pages related to computing kernel results. Although the allocation in user space is contiguous these pages may be spanned in several non-consecutive page frames (K results 1) 997$_1$ and (K results 2) 997$_2$. The shared physical memory 911 may comprise GPPU queue mechanics and the hardware queues in one or more page frames 995. The queues mechanics and user level queue generally are stored in a single physical page that can be accessed via the Reserved VA-PA mappings 982.

Also shown in FIG. 9 is the user level queue structure and the base virtual address of the circular ring buffer where GPPU packets are stored. This virtual address to Physical translation of the base address is also stored in the reserved VA-PA mapping table. The ring buffer may be stored on the same page frame or in another page frame managed by the host OS. Each GPU packet comprises pointers to virtual memory locations used by the application requesting the computing kernel offloading, such as the virtual address associated with kobj (instruction code), the virtual address associated with the kernel data (processing data) 998 and the virtual address associated with the kernel results 997.

Thus, in some embodiments an offloaded computing kernel may be represented by a single packet. Since in a packet the list of physical addresses of page frames have been stored by the ULDD, the GPPU mean while starts to fill the translation table with these addresses communicates to the coprocessor the relative handles related to the code, data and results of the computing kernel that has to be executed. Thus, the GGPU presents to the co-processor a contiguous address space for code, data and results. Since the GPPU can provide to the co-processor the correct physical address when it is requested, the co-processor uses only the virtual addresses associated with instruction code, processing data and kernels results.

Thus, the co-processors read or write operation performed during the computing kernel executing (process data 507) use virtual addresses that are converted to physical using the VA-PA mappings 981. Compared to an IOMMU no translation misses are produced by the GPPU.

Figure 10:
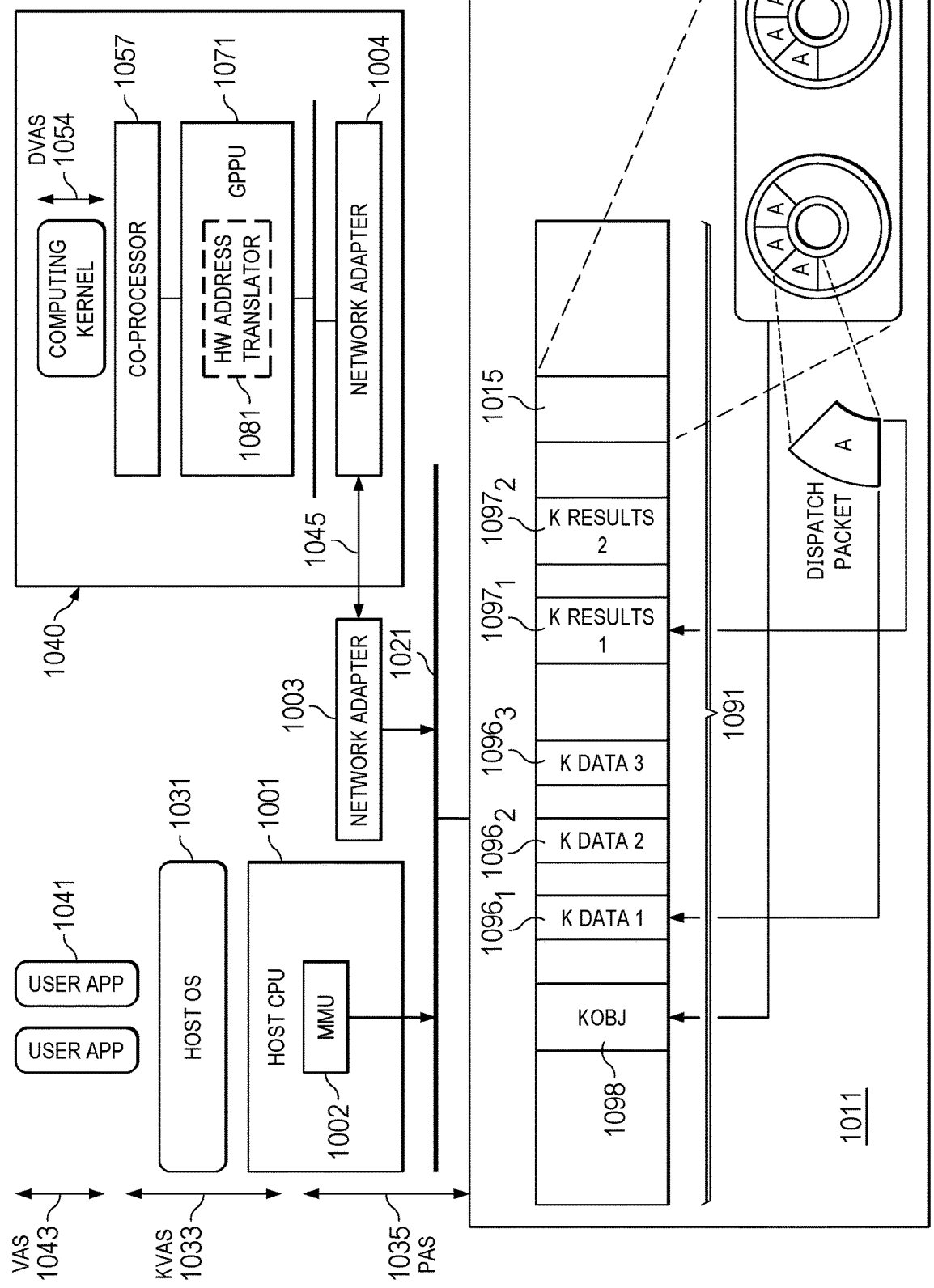
FIG. 10 shows an additional example shared memory transfer or kernel offload between a CPU and device using a GPPU arrangement further implementing hardware address translation according to some embodiments.

With respect to FIG. 10 a further example user level application computing kernel dispatching using a GPPU that includes hardware component that implements the virtual to physical translation is provided. In this example, the co-processor 1057 is a discrete entity 1040 located outside the MPSoC. The communication between the MPSoC and the discrete co-processor is implemented via a communication network 1045, such as PCIe, Ethernet, etc. This means that in both sides we have a local network adapter component 1003 and a remote network adapter 1004. In the example shown in FIG. 10 the CPU MMU 1002 enables the CPU 1001 to translate virtual addresses, such as an address within an application virtual address space (VAS) 1043 from the user application, into physical addresses which can be output onto the memory bus to access the memory 1011.

Since the co-processor 1057 cannot access directly the memory 1011 this is realized via the network adapters 1003, 1004 and GPPU 1071. The network adapter 1003 with the support of well-known in the art on-chip bus solutions 1021 can extend the I/O coherence of the Host CPU 1001 toward the discrete co-processor 1057. Then, the GPPU 1071 implements the user level queue management and the efficient translation to physical address via the hardware address translation table 1081. The co-processor 1057 may use the GPPU 1071 to access directly the shared memory 1011 bringing the co-processor as first class of co-processor as illustrated in FIG. 9. The GPPU 1057 eliminates the need of a specific KLDD and the need of scatter and gather DMA, allowing a direct access to application user space memory 1043, thus improving the overall performance. In addition, a portion of the accelerator MMIO space can be directly mapped to VAS 1043.

As described previously in some embodiments the memory 1011 is a shared physical memory managed by the Host OS. The shared physical memory 111 some embodiments, such as shown in FIG. 10, comprises a set of pages frames managed by the OS. The size of these pages is defined by the OS. According to some of the disclosed embodiments the GPPU 1071 includes the hardware translation table 1005 supporting configurable page size that enable one to share the physical memory between the host processor and the discrete co-processor 1057.

Some virtual pages that identify the computing kernel may be allocated by the application before the offload phase. These pages may contain kernel objects (instruction code) such as shown in physical space (kobj) 1098 and kernel data (processing data) 1096. At the application level the allocation of memory may be done with standard memory allocators provided by the Host OS.

This means that the allocation is done at user space. Since the host CPU has a virtual memory system, the allocated buffers are broken into page frames and generally distributed about the physical memory 111 a non-contiguous fashion.

The computing kernel objects and computing kernel data, as shown, are located in several physical pages (kdata1) 1096$_1$, (kdata2) 1096$_2$, (kdata3) 1096$_3$. This is the case when the size is larger than the physical page size. The application may allocate also the pages related to computing kernel results. Although the allocation in user space is contiguous these pages may span several non-consecutive page frames (K results 1) 1097$_1$ and (K results 2) 1097$_2$. The shared physical memory 1011 may comprise GPPU queue mechanics and the hardware queues in one or more page frames 1015. The queue mechanics and user level queue generally are stored in a single physical page that can be accessed via the Reserved VA-PA mappings 1082.

As shown in FIG. 10, the user level queue structure includes the base virtual address of the circular ring buffer where GPPU packets are stored. This virtual address to Physical translation of the base address is also stored in the reserved VA-PA mapping table. The ring buffer may be stored on the same page frame or in another page frame managed by the host OS. Each GPPU packet comprises pointers to virtual memory locations used by the application requesting the computing kernel offloading such as the virtual address associated with kobj (instruction code), the virtual address associated the kernel data (processing data) 1098 and the virtual address associated with the kernel results 1097.

Thus, in some embodiments an offloaded computing kernel may be represented by a single packet. Since the packet contains the bootstrap translation address related to code, data and results, the GPPU 1071 can start to fill the translation tables. In parallel, the GPPU 1071 can communicate to the co-processor 1057 the relative information related to the code, data and results of the computing kernel that has to be executed. Thus, the GPPU presents to the co-processor a contiguous address space for code, data and results. Using this information the coprocessor 1057 can read any particular address in VAS by sending the address to the GPPU 1071, then the GPPU translates it and fetches the data from memory and returns it to the co-processor 1057. The co-processor 1057 may also produce one or more DMA streams of requests to access to the code and data of computing kernel. These streams are received and executed by the GPPU. The GPPU using the hardware translation table is able to issue the set of bus transactions able to transfer from the system memory 1091 to the coprocessor 1057. This means that the Coprocessor or the associated DMA included in the coprocessor will work in the device virtual address space 253.

The GPPU 1071 may generate interrupts to wake up the application 1041 running in VAS 2043. Accordingly, the presently disclosed embodiments of the interrupt are received by the Host OS 1031 and by calling ISR 3109 and GPPU device driver the application is woke up using OS synchronization functions well known by those skilled in the art. Various embodiments with different variations have been described above.

It should be noted that those skilled in the art may combine various elements of these various embodiments and variations. Such alterations, modifications, and improvements are intended to be part of this disclosure, and are intended to be within the scope of the present invention. Accordingly, the foregoing description is by way of example only and is not intended to be limiting. The present disclosure is limited only as defined in the following claims and the equivalents thereto.

What is claimed is:

1. A method of offloading a computing kernel from a host central processing unit (CPU) running an operating system (OS) to a co-processor using general packet processing unit (GPPU) coupled between the host CPU and the co-processor, the method comprising:
    obtaining, by an application running on the host CPU, a packet virtual address of a GPPU packet in a user level queue of the GPPU;
    initializing, by the application, the GPPU packet referenced by the packet virtual address using an application programming interface (API) of a user level device driver (ULDD), the GPPU packet comprising a plurality of handles corresponding to the computing kernel;
    finalizing, by the ULDD, the GPPU packet by including a list of bootstrap translation addresses comprising a physical address and a virtual address for each of the plurality of handles and output by a kernel level device driver (KLDD) of the OS; and
    accessing, by the application using the packet virtual address, results obtained from the co-processor processing the computing kernel.

2. The method of claim 1, wherein obtaining the packet virtual address comprises:
    obtaining, by the application, a base virtual address of a circular buffer of the GPPU used to store GPPU packets;
    obtaining, by the application using the base virtual address, a read index of the user level queue and a write index of the user level queue using the API of the ULDD; and
    determining the packet virtual address by adding the write index to the base virtual address.

3. The method of claim 2, wherein obtaining the base virtual address comprises instantiating the user level queue using the API of the ULDD to obtain the base virtual address mapped to a physical address located in a page frame managed by the OS.

4. The method of claim 1, further comprising:
    prior to obtaining the packet virtual address, determining, by the application, whether the user level queue is full;
    in response to determining that the user level queue is full, looping in a wait cycle; and
    in response to determining that the user level queue is not full, obtaining the packet virtual address.

5. The method of claim 1, wherein creating the list of bootstrap translation addresses comprises:
    determining whether the GPPU packet is a dispatch and translate packet;
    in response to determining that the GPPU packet is a dispatch and translate packet, calling the KLDD for each of the plurality of handles to create the list of bootstrap translation addresses; and
    storing the list of bootstrap translation addresses in the GPPU packet.

6. The method of claim 1, wherein creating the list of bootstrap translation addresses comprises:
    determining whether one or more bootstrap addresses are missing from the list of bootstrap translation addresses;
    in response to determining that one or more bootstrap addresses are missing from the list of bootstrap translation addresses, calling the KLDD for specific handles of the plurality of handles corresponding to the one or more bootstrap addresses to complete the list of bootstrap translation addresses; and
    storing the list of bootstrap translation addresses in the GPPU packet.

7. The method of claim 1, further comprising:
    after finalizing the GPPU packet, ringing, by the application, a doorbell signal of the GPPU using the API to allow the GPPU packet to be schedulable for processing by the co-processor.

8. The method of claim 1, wherein accessing the results comprises:
    after finalizing the GPPU packet, waiting, by the application, for completion of the computing kernel by the co-processor; and
    in response to a wake-up mechanism of the GPPU, accessing, by the application, the results.

9. A method of offloading a computing kernel from a host central processing unit (CPU) running an operating system (OS) to a co-processor using general packet processing unit (GPPU) coupled between the host CPU and the co-processor, the method comprising:
    determining, by an application running on the host CPU, whether a user level queue of the GPPU is full;
    in response to determining that the user level queue is full, calling an update function included in an application programming interface (API) of a user level device driver (ULDD) to receive a coded integer representing a mean time of computing kernel execution,
    determining whether the coded integer is nonzero,
    in response to determining that the coded integer is nonzero, sleeping for a duration associated with the coded integer, and
    in response to determining that the code integer is zero, determining that the user level queue is not full;
    in response to determining that the user level queue is not full, obtaining, by the application, a packet virtual address of a GPPU packet in the user level queue;

initializing, by the application, the GPPU packet referenced by the packet virtual address using the API, the GPPU packet comprising a plurality of handles corresponding to the computing kernel;

finalizing, by the ULDD, the GPPU packet by including a list of bootstrap translation addresses comprising a physical address and a virtual address for each of the plurality of handles and output by a kernel level device driver (KLDD) of the OS; and accessing, by the application using the packet virtual address, results obtained from the co-processor processing the computing kernel.

10. The method of claim 9, wherein obtaining the packet virtual address comprises:

obtaining, by the application, a base virtual address of a circular buffer of the GPPU used to store GPPU packets;

obtaining, by the application using the base virtual address, a read index of the user level queue and a write index of the user level queue using the API of the ULDD; and determining the packet virtual address by adding the write index to the base virtual address.

11. The method of claim 9, wherein creating the list of bootstrap translation addresses comprises:

determining whether the GPPU packet is a dispatch and translate packet;

in response to determining that the GPPU packet is a dispatch and translate packet, calling the KLDD for each of the plurality of handles to create the list of bootstrap translation addresses; and storing the list of bootstrap translation addresses in the GPPU packet.

12. The method of claim 9, wherein creating the list of bootstrap translation addresses comprises:

determining whether one or more bootstrap addresses are missing from the list of bootstrap translation addresses;

in response to determining that one or more bootstrap addresses are missing from the list of bootstrap translation addresses, calling the KLDD for specific handles of the plurality of handles corresponding to the one or more bootstrap addresses to complete the list of bootstrap translation addresses; and storing the list of bootstrap translation addresses in the GPPU packet.

13. The method of claim 9, further comprising:

after finalizing the GPPU packet, ringing, by the application, a doorbell signal of the GPPU using the API to allow the GPPU packet to be schedulable for processing by the co-processor.

14. The method of claim 9, wherein accessing the results comprises:

after finalizing the GPPU packet, waiting, by the application, for completion of the computing kernel by the co-processor; and in response to a wake-up mechanism of the GPPU, accessing, by the application, the results.

15. A method of offloading a computing kernel from a host central processing unit (CPU) running an operating system (OS) to a co-processor using general packet processing unit (GPPU) coupled between the host CPU and the co-processor, the method comprising:

obtaining, by an application running on the host CPU, a packet virtual address of a GPPU packet in a user level queue of the GPPU;

initializing, by the application, the GPPU packet referenced by the packet virtual address using an application programming interface (API) of a user level device driver (ULDD), the GPPU packet comprising a plurality of handles comprising a first handle relating to code of the computing kernel, a second handle relating to data of the computing kernel, and a third handle relating to results of the computing kernel;

finalizing, by the ULDD, the GPPU packet by determining whether the GPPU packet is a dispatch and translate packet;

in response to determining that the GPPU packet is a dispatch and translate packet, creating a list of bootstrap translation addresses by calling a kernel level device driver (KLDD) of the OS for each of the first handle, the second handle, and the third handle, the list of bootstrap translation addresses comprising a physical address and a virtual address for each of the plurality of handles, and storing the list of bootstrap translation addresses in the GPPU packet; and accessing, by the application using the packet virtual address, results obtained from the co-processor processing the computing kernel.

16. The method of claim 15, wherein obtaining the packet virtual address comprises:

obtaining, by the application, a base virtual address of a circular buffer of the GPPU used to store GPPU packets;

obtaining, by the application using the base virtual address, a read index of the user level queue and a write index of the user level queue using the API of the ULDD; and determining the packet virtual address by adding the write index to the base virtual address.

17. The method of claim 15, further comprising:

prior to obtaining the packet virtual address, determining, by the application, whether the user level queue is full;

in response to determining that the user level queue is full, looping in a wait cycle; and in response to determining that the user level queue is not full, obtaining the packet virtual address.

18. The method of claim 15, wherein creating the list of bootstrap translation addresses comprises:

determining whether one or more bootstrap addresses are missing from the list of bootstrap translation addresses;

in response to determining that one or more bootstrap addresses are missing from the list of bootstrap translation addresses, calling the KLDD for specific handles of the plurality of handles corresponding to the one or more bootstrap addresses to complete the list of bootstrap translation addresses; and storing the list of bootstrap translation addresses in the GPPU packet.

19. The method of claim 15, further comprising:

after finalizing the GPPU packet, ringing, by the application, a doorbell signal of the GPPU using the API to allow the GPPU packet to be schedulable for processing by the co-processor.

20. The method of claim 15, wherein accessing the results comprises:

after finalizing the GPPU packet, waiting, by the application, for completion of the computing kernel by the co-processor; and in response to a wake-up mechanism of the GPPU, accessing, by the application, the results.

* * * * *